(12) United States Patent
Lee et al.

(10) Patent No.: US 12,038,537 B2
(45) Date of Patent: Jul. 16, 2024

(54) CAMERA MODULE INCLUDING TILTABLE FILTER

(71) Applicant: LG INNOTEK CO., LTD., Seoul (KR)

(72) Inventors: Woong Lee, Seoul (KR); Sung Ha Jang, Seoul (KR); Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 276 days.

(21) Appl. No.: 17/611,841

(22) PCT Filed: May 15, 2020

(86) PCT No.: PCT/KR2020/006426
§ 371 (c)(1),
(2) Date: Nov. 16, 2021

(87) PCT Pub. No.: WO2020/231222
PCT Pub. Date: Nov. 19, 2020

(65) Prior Publication Data
US 2022/0214432 A1    Jul. 7, 2022

(30) Foreign Application Priority Data
May 16, 2019   (KR) .................. 10-2019-0057641

(51) Int. Cl.
*G01S 7/481*       (2006.01)
*G01S 17/894*      (2020.01)
(Continued)

(52) U.S. Cl.
CPC .......... *G01S 7/4816* (2013.01); *G01S 17/894* (2020.01); *G02B 7/006* (2013.01);
(Continued)

(58) Field of Classification Search
CPC ..... G01S 7/4816; G01S 17/894; H04N 23/56; H04N 23/55; H04N 23/57; H04N 23/50;
(Continued)

(56) References Cited

U.S. PATENT DOCUMENTS

| 10,356,380 | B2 | 7/2019 | You et al. |
| 2013/0088767 | A1 | 4/2013 | Uchida |

(Continued)

FOREIGN PATENT DOCUMENTS

| CN | 102224431 A | 10/2011 |
| KR | 10-1629610 B1 | 6/2016 |

(Continued)

*Primary Examiner* — Marly S Camargo
(74) *Attorney, Agent, or Firm* — Birch, Stewart, Kolasch & Birch, LLP

(57) ABSTRACT

A camera module according to an embodiment of the present invention comprises: a light emitting unit for outputting an optical signal to an object; and a light receiving unit for receiving a reflected light obtained after the optical signal is reflected by the object, wherein the light receiving unit comprises: a sensor for receiving the reflected light; a filter for transmitting the reflected light in a specific wavelength band; a driving unit for tilting the filter; and a driving circuit for driving the driving unit, and the filter is sequentially tilted from a reference state, in which the filter is not tilted, to a first to a third tilted state in which the filter is tilted in different directions, so as to allow the sensor to receive the reflected light.

13 Claims, 22 Drawing Sheets

(51) Int. Cl.
*G02B 5/20* (2006.01)
*G02B 7/00* (2021.01)
*G03B 17/12* (2021.01)
*H02K 41/035* (2006.01)
*H04N 23/55* (2023.01)
*H04N 23/56* (2023.01)
*H04N 23/57* (2023.01)

(52) U.S. Cl.
CPC ......... *H02K 41/0356* (2013.01); *H04N 23/55* (2023.01); *H04N 23/56* (2023.01)

(58) Field of Classification Search
CPC ...... G02B 7/006; G02B 5/20; H02K 41/0356; G03B 17/12
See application file for complete search history.

(56) References Cited

U.S. PATENT DOCUMENTS

| | | | |
|---|---|---|---|
| 2014/0125825 A1 | 5/2014 | Baer et al. | |
| 2019/0104239 A1* | 4/2019 | Aschwanden | H04N 23/6845 |
| 2022/0074830 A1* | 3/2022 | Lee | H04N 23/58 |
| 2023/0076838 A1* | 3/2023 | Kim | H04N 23/56 |

FOREIGN PATENT DOCUMENTS

| | | |
|---|---|---|
| KR | 10-1634299 B1 | 6/2016 |
| KR | 10-2017-0050058 A | 5/2017 |

* cited by examiner

[FIG. 1]
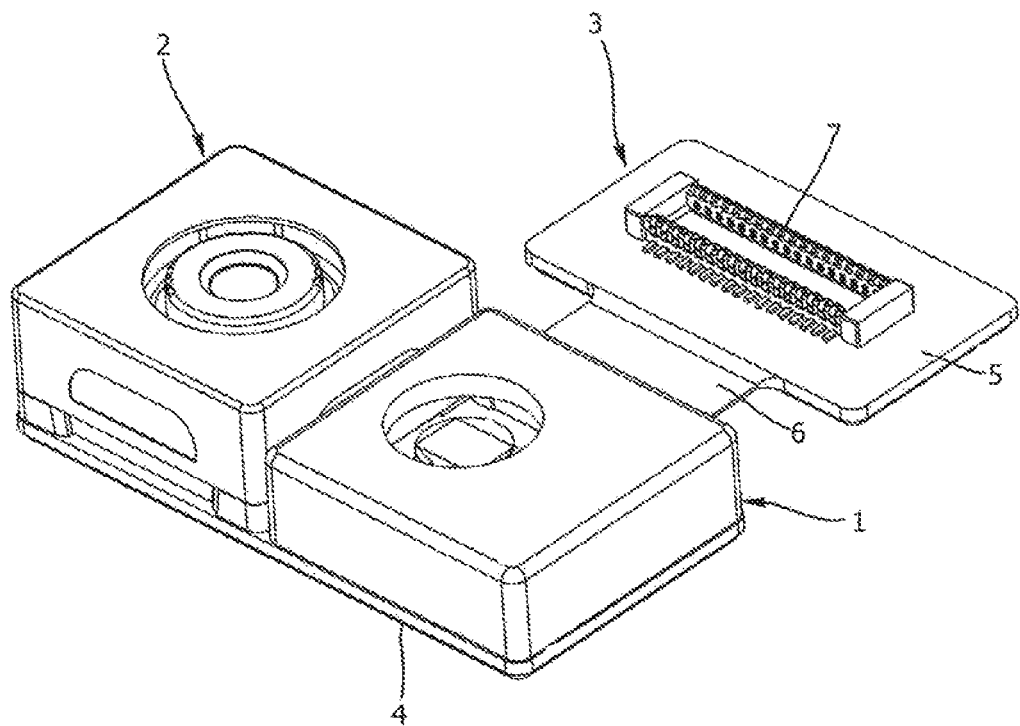
[FIG. 2]
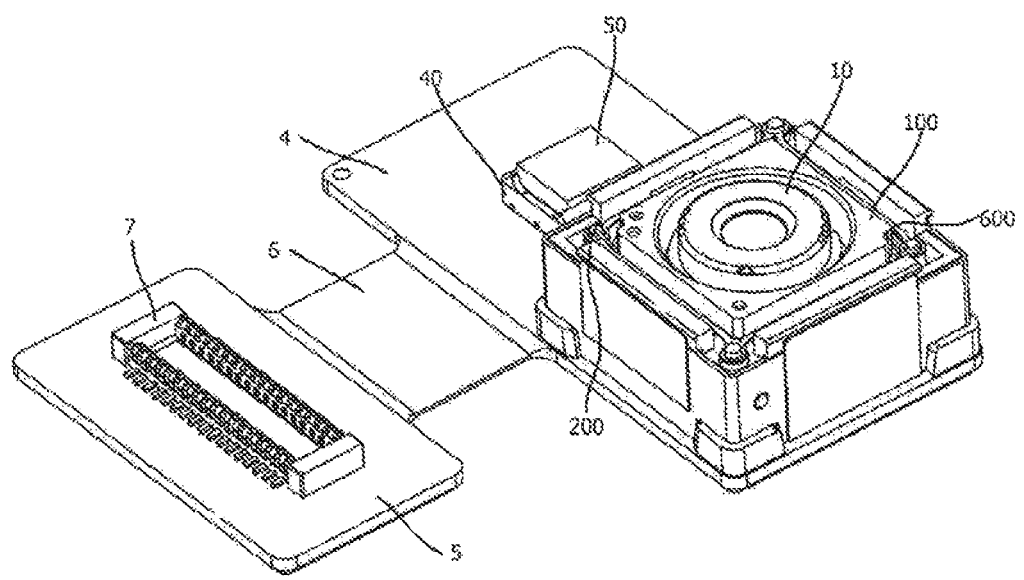

[FIG. 3]
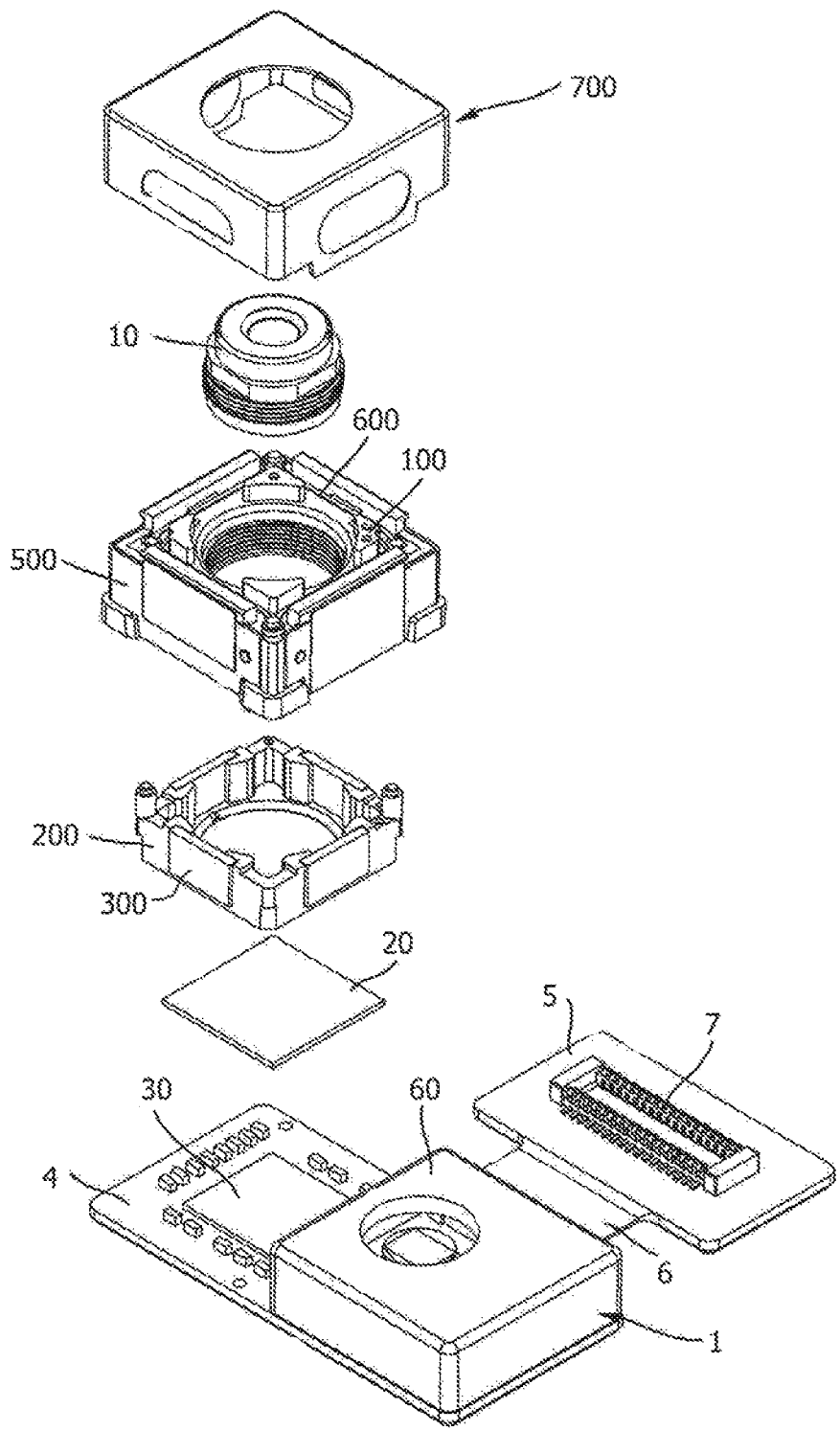

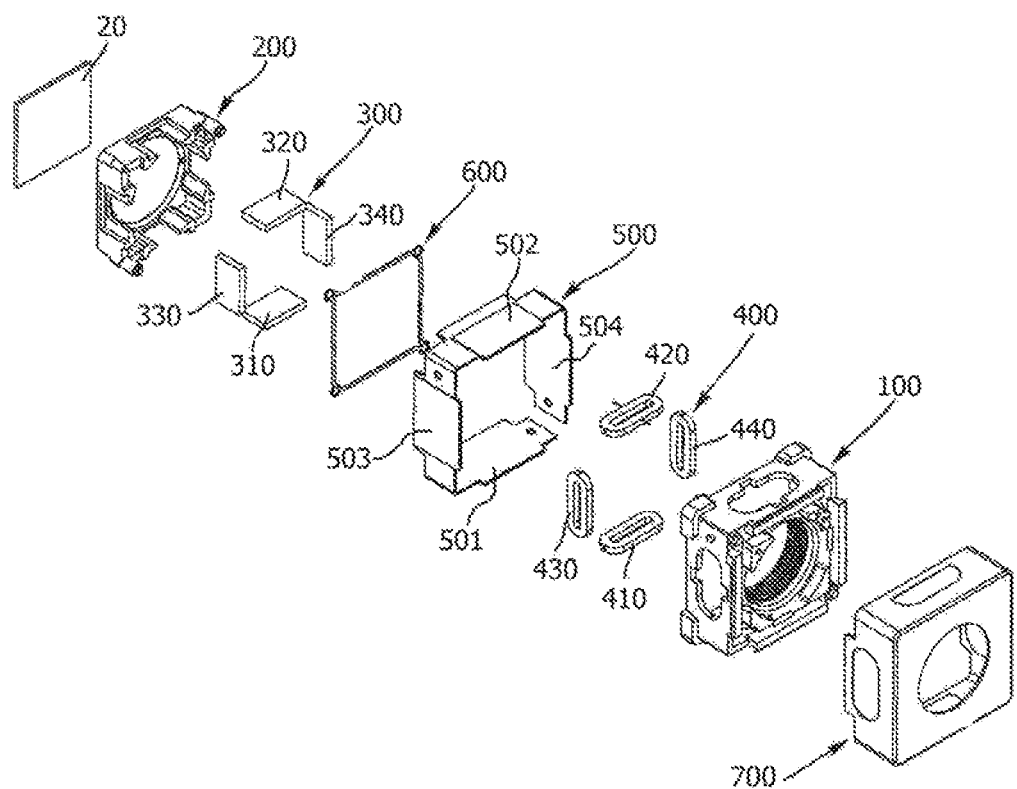

[FIG. 5]
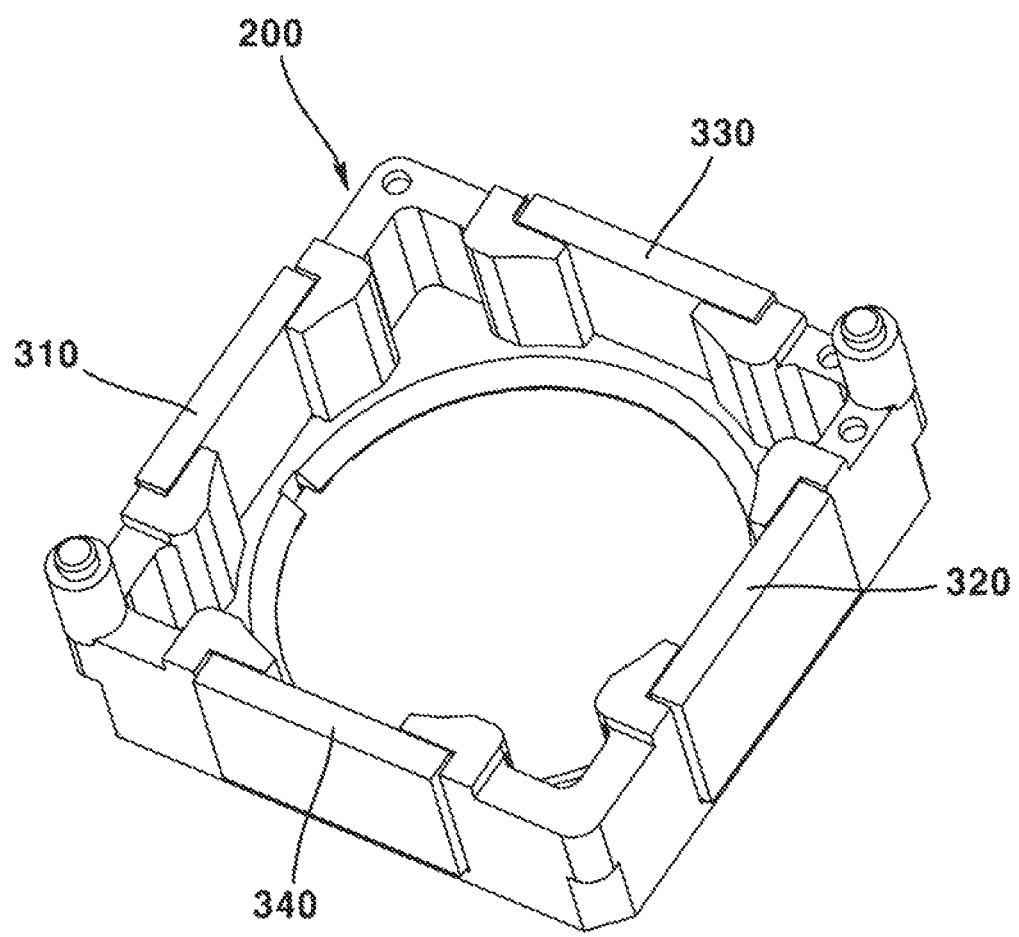

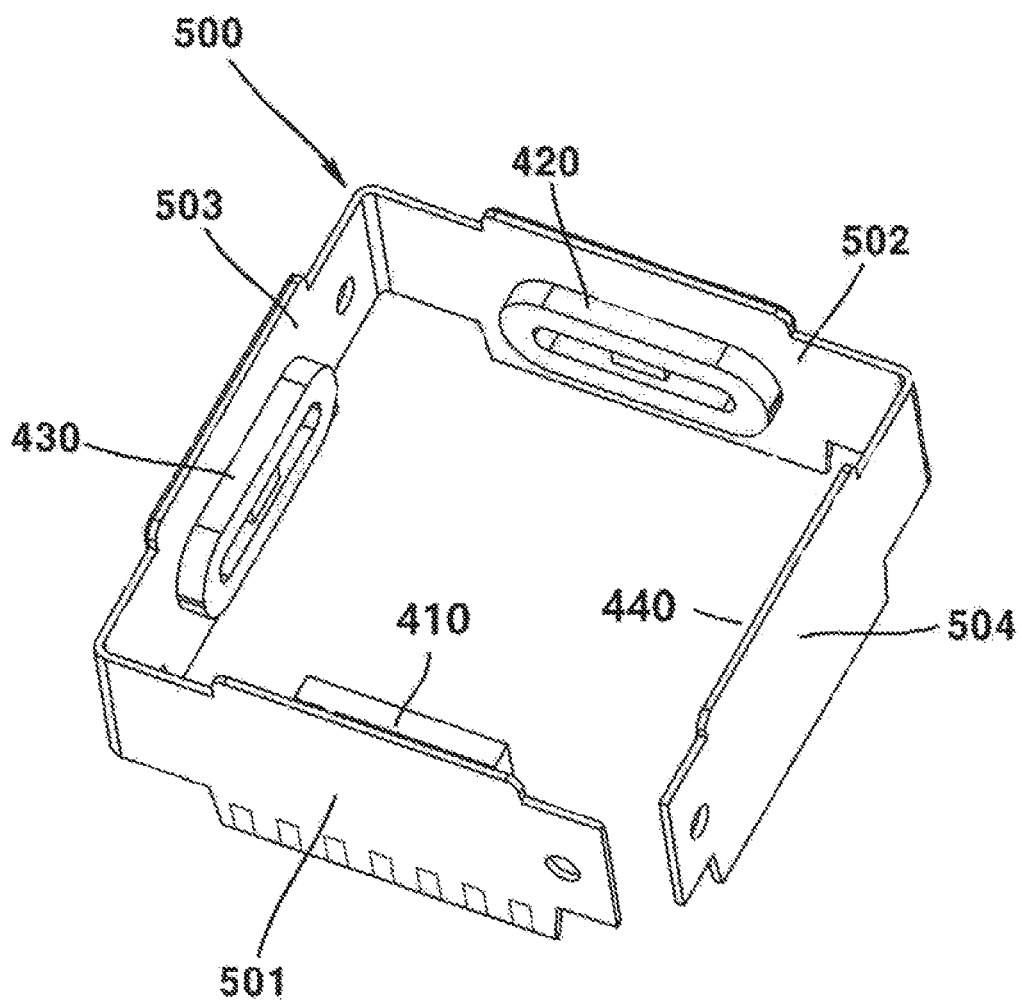
[FIG. 6]

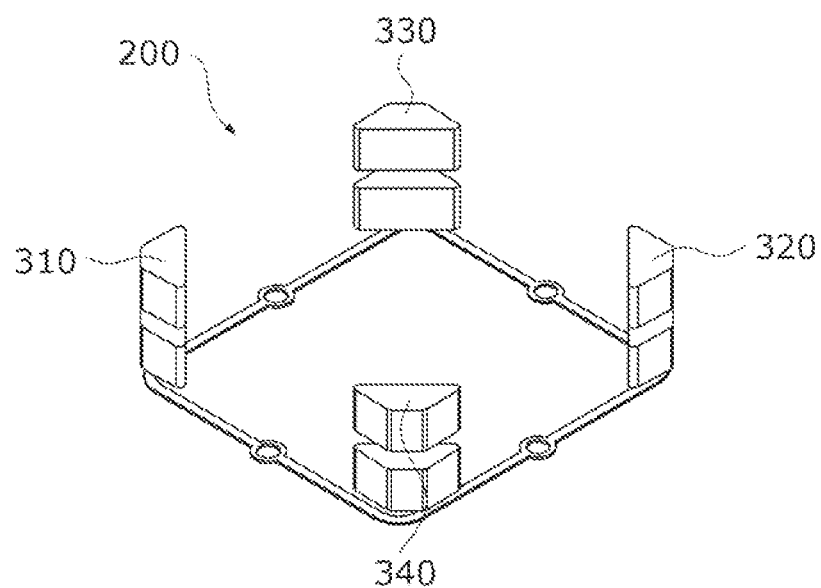

[FIG. 8]
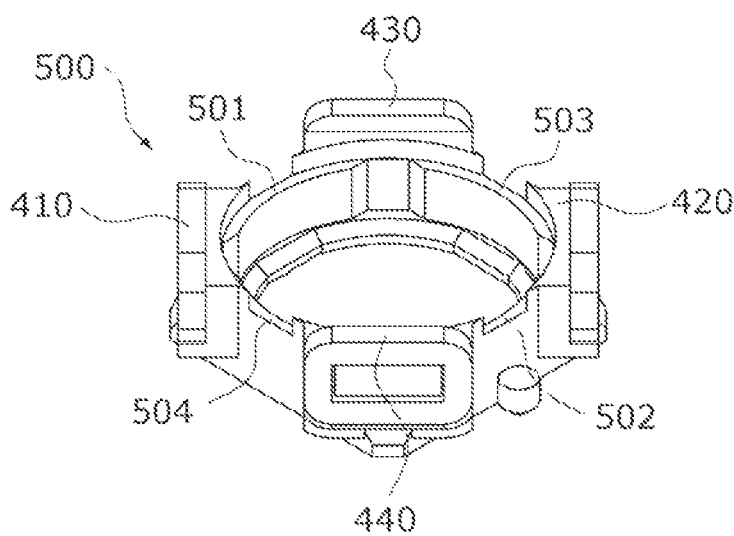
[FIG. 9]
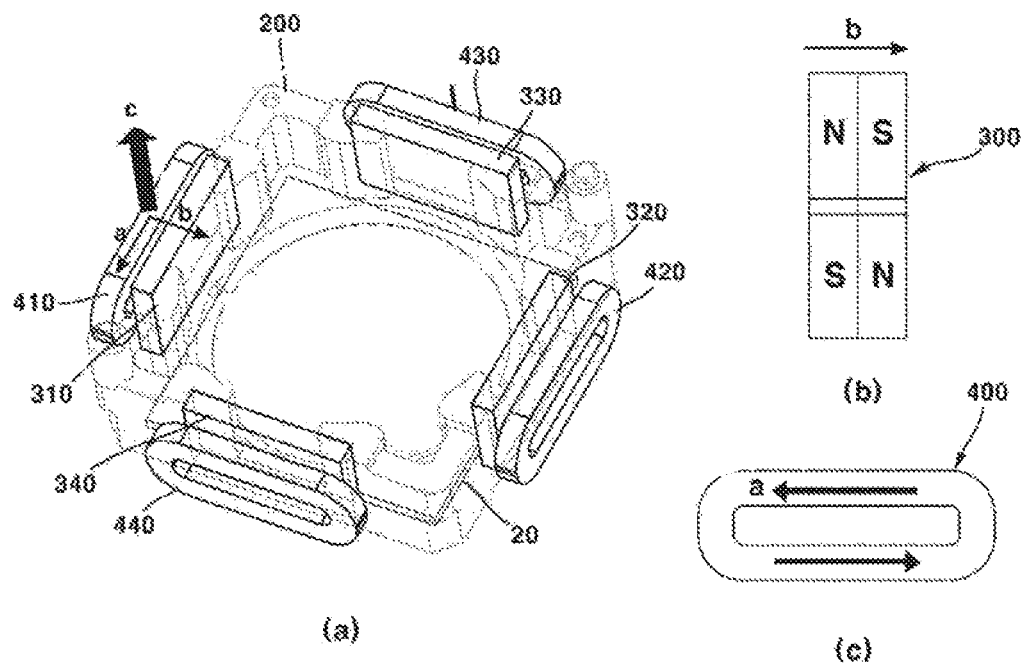

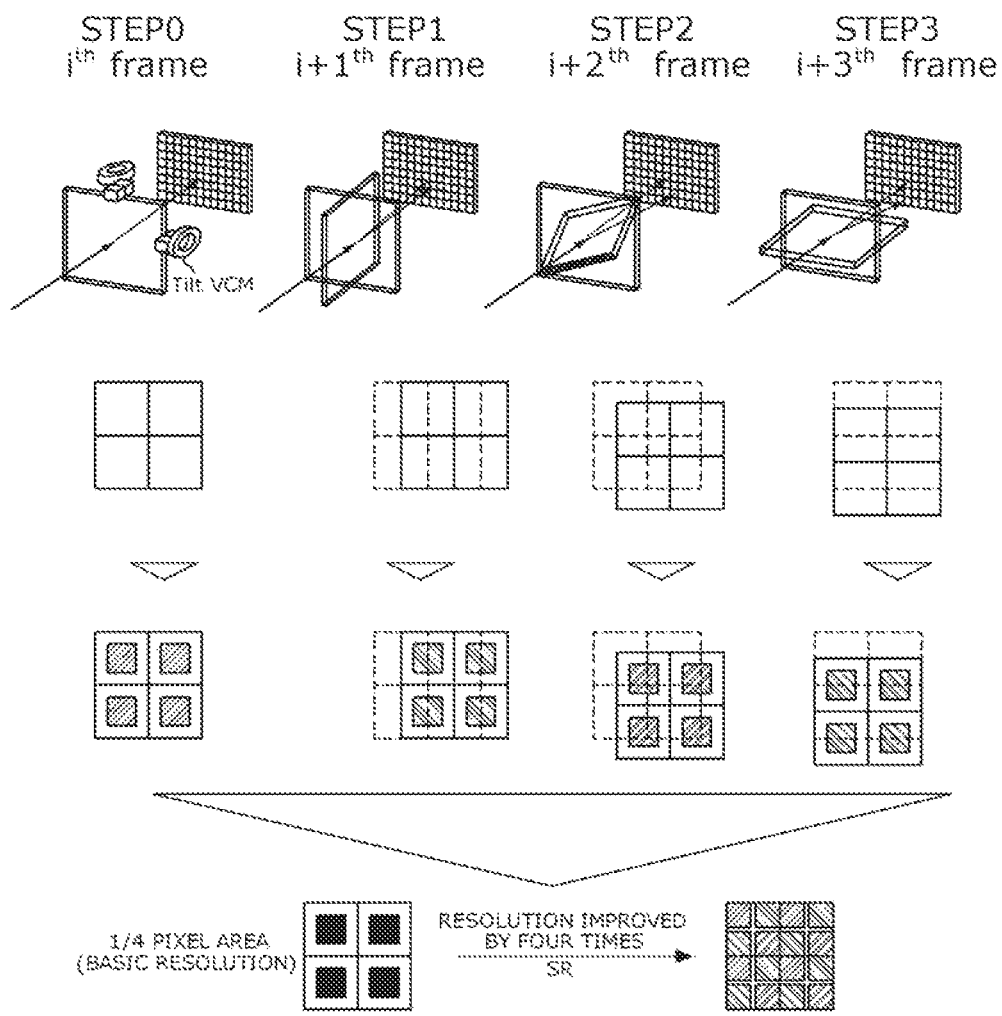

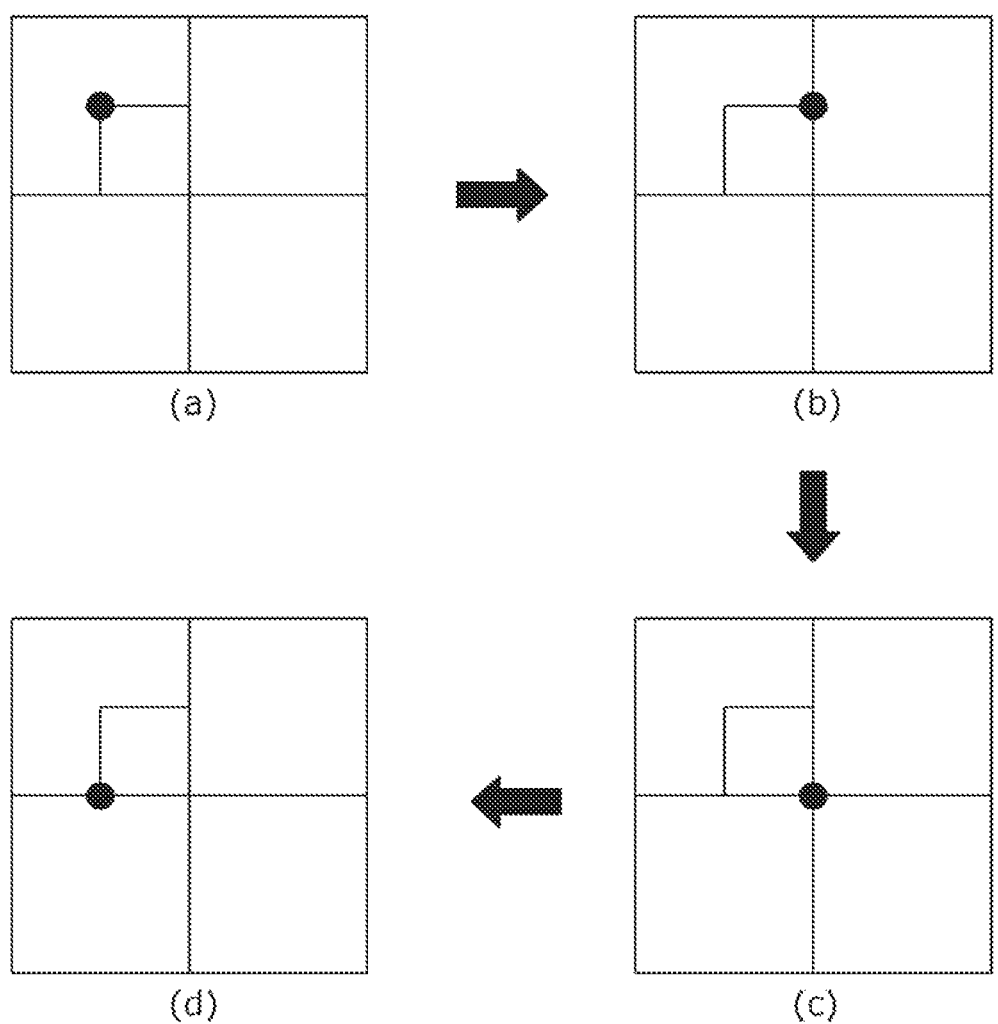
[FIG. 11]

[FIG. 12]
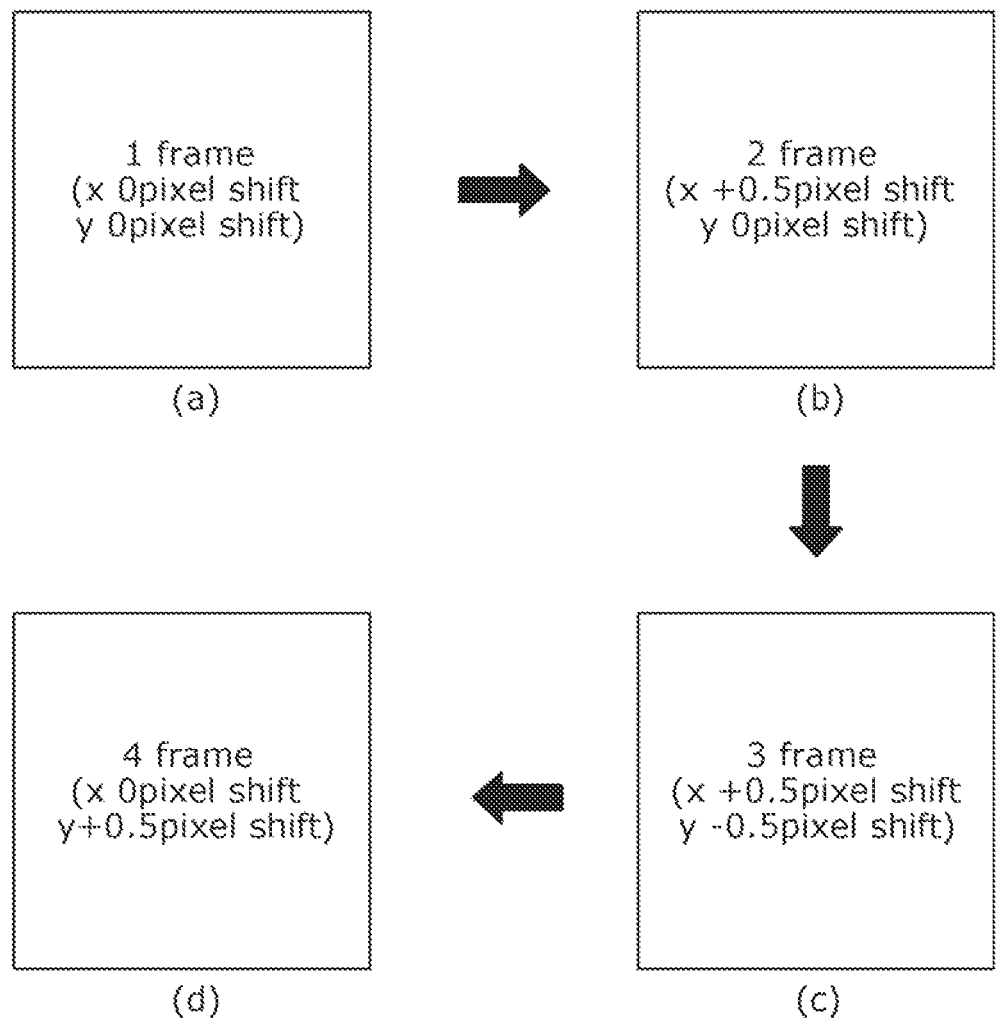

[FIG. 13]
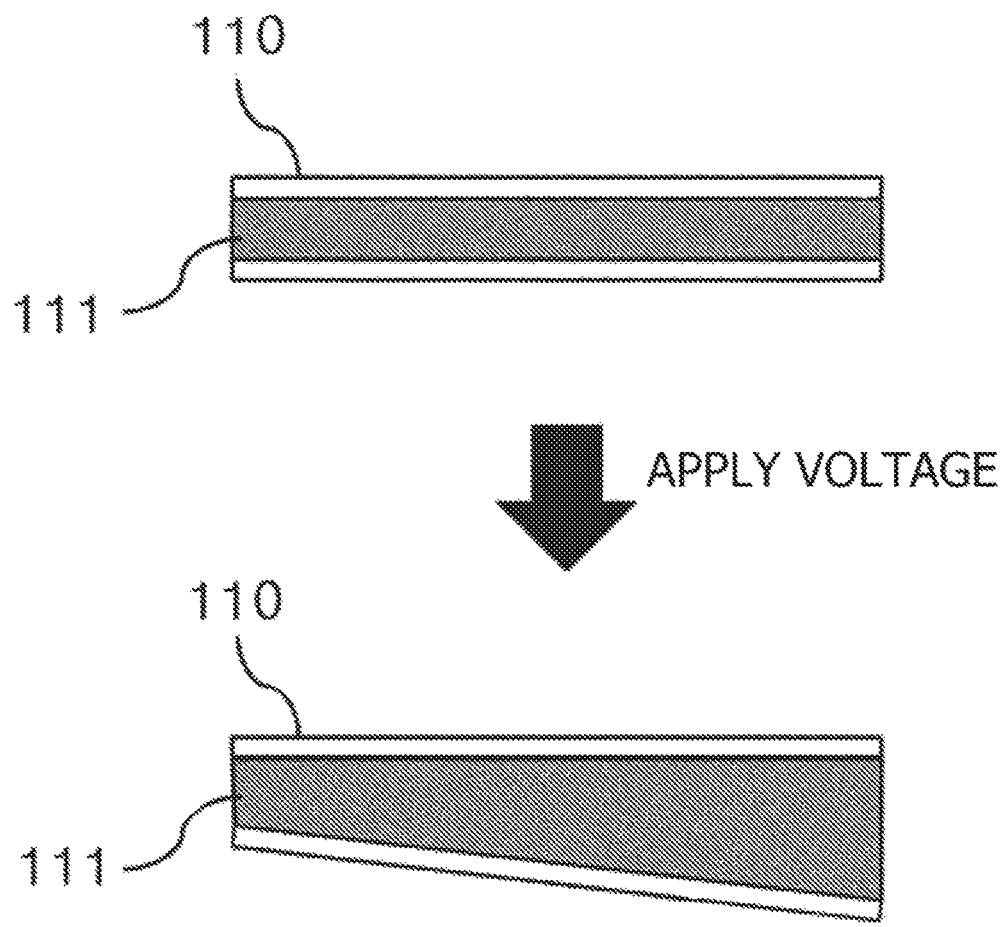

[FIG. 14]
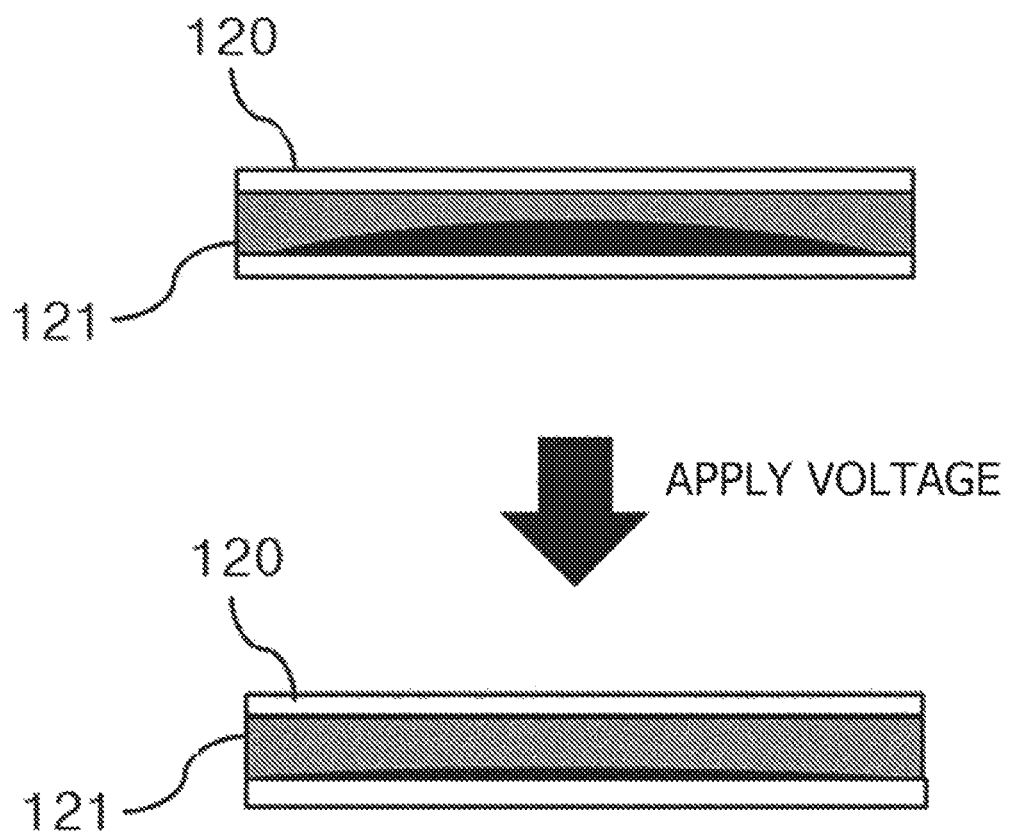

[FIG. 15]
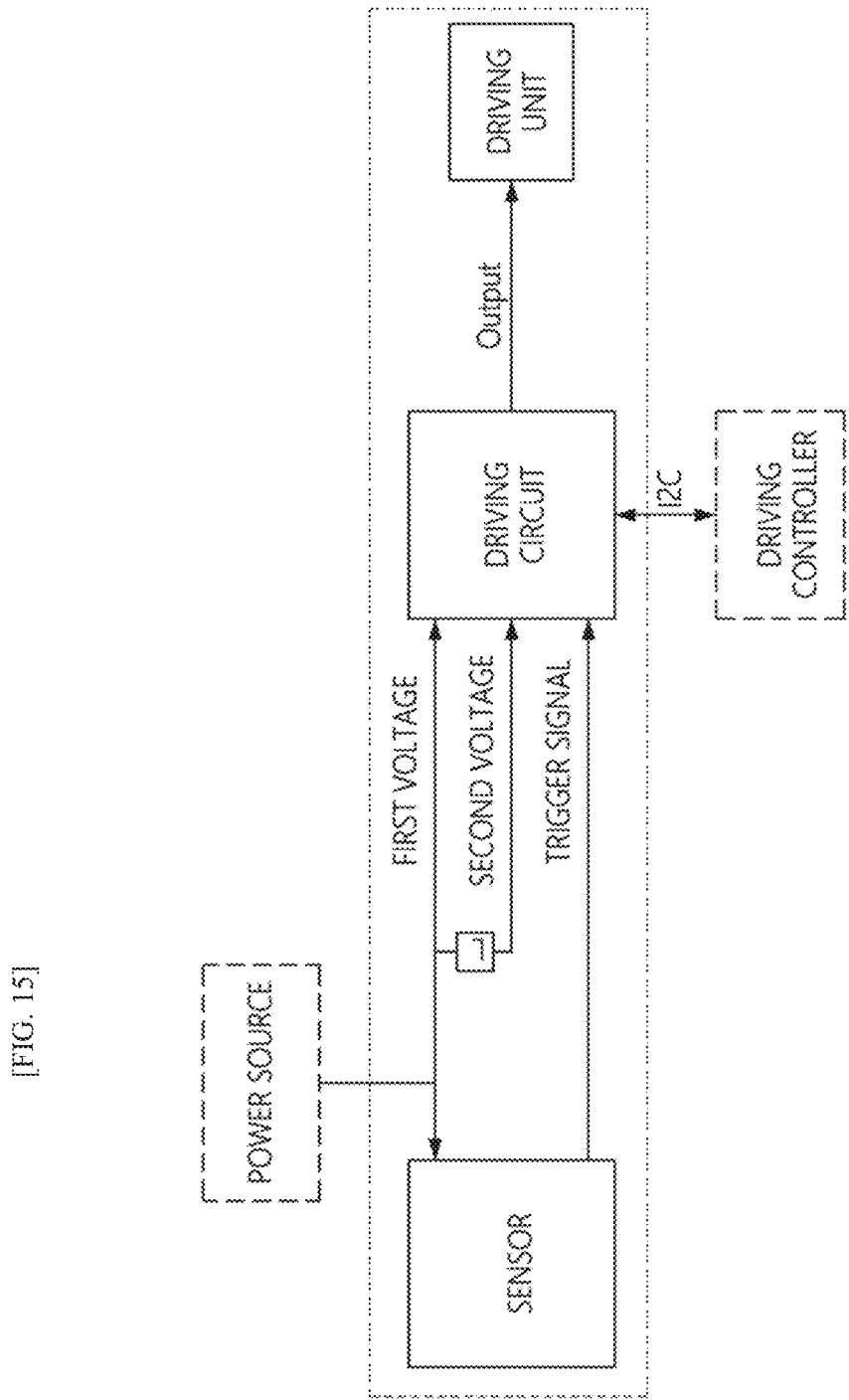

[FIG. 16]
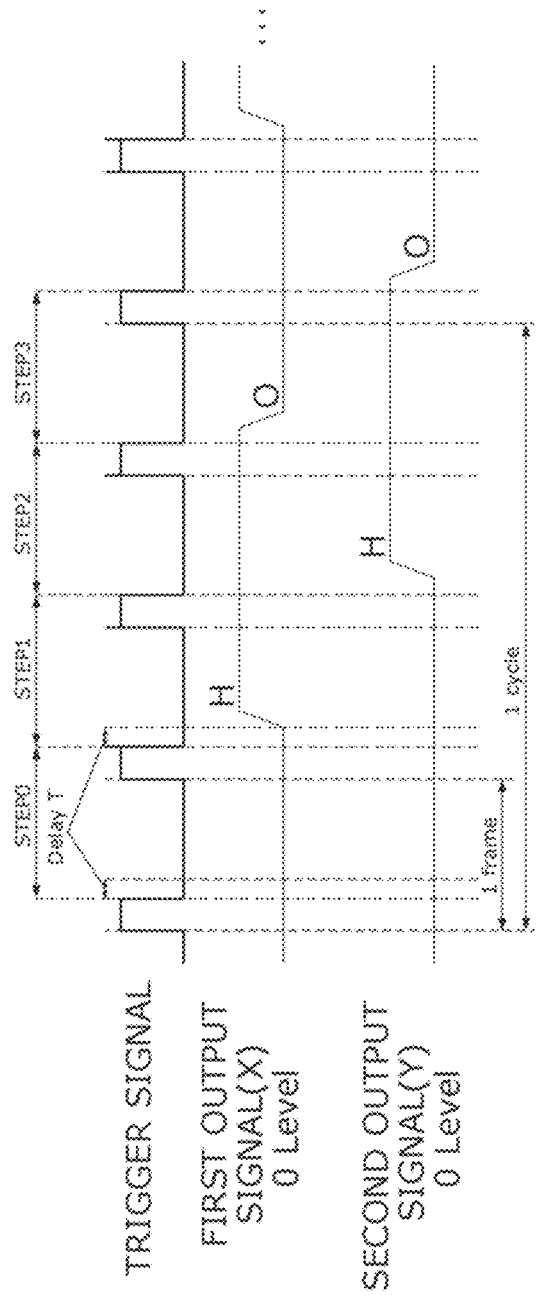

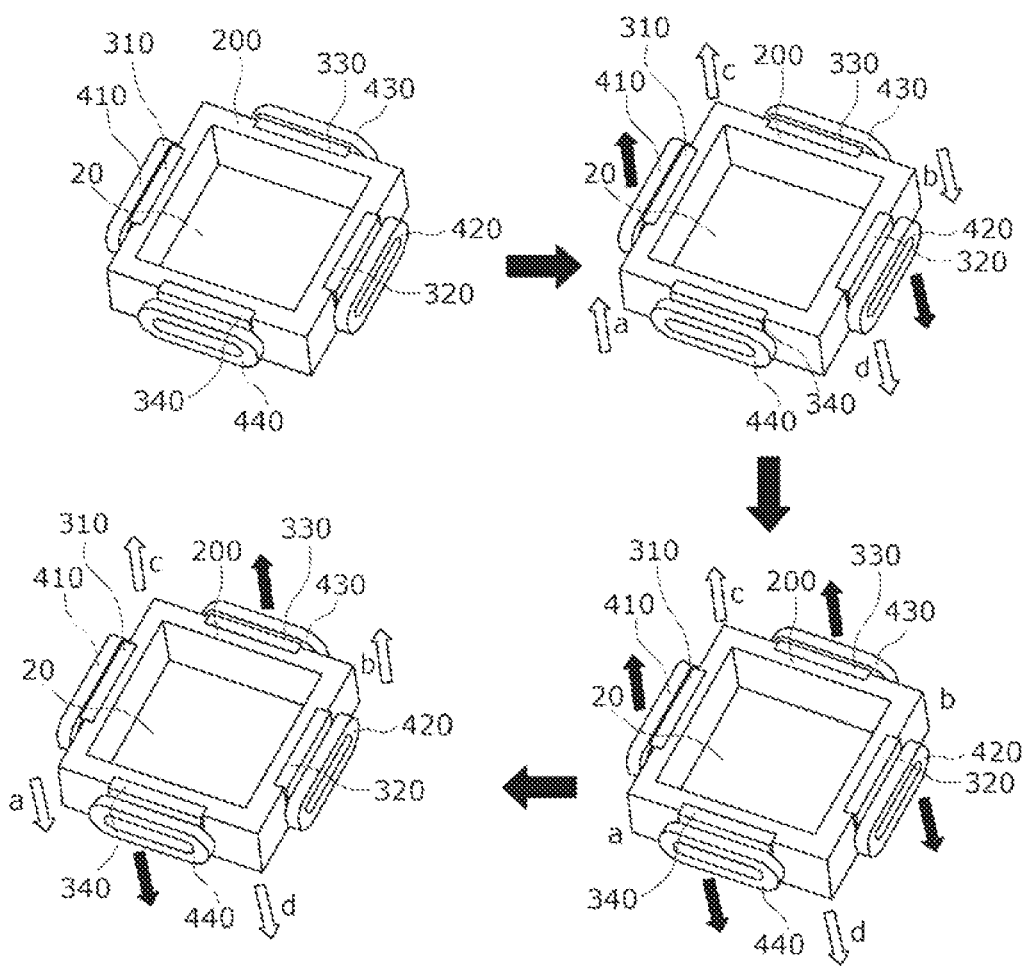
[FIG. 17]

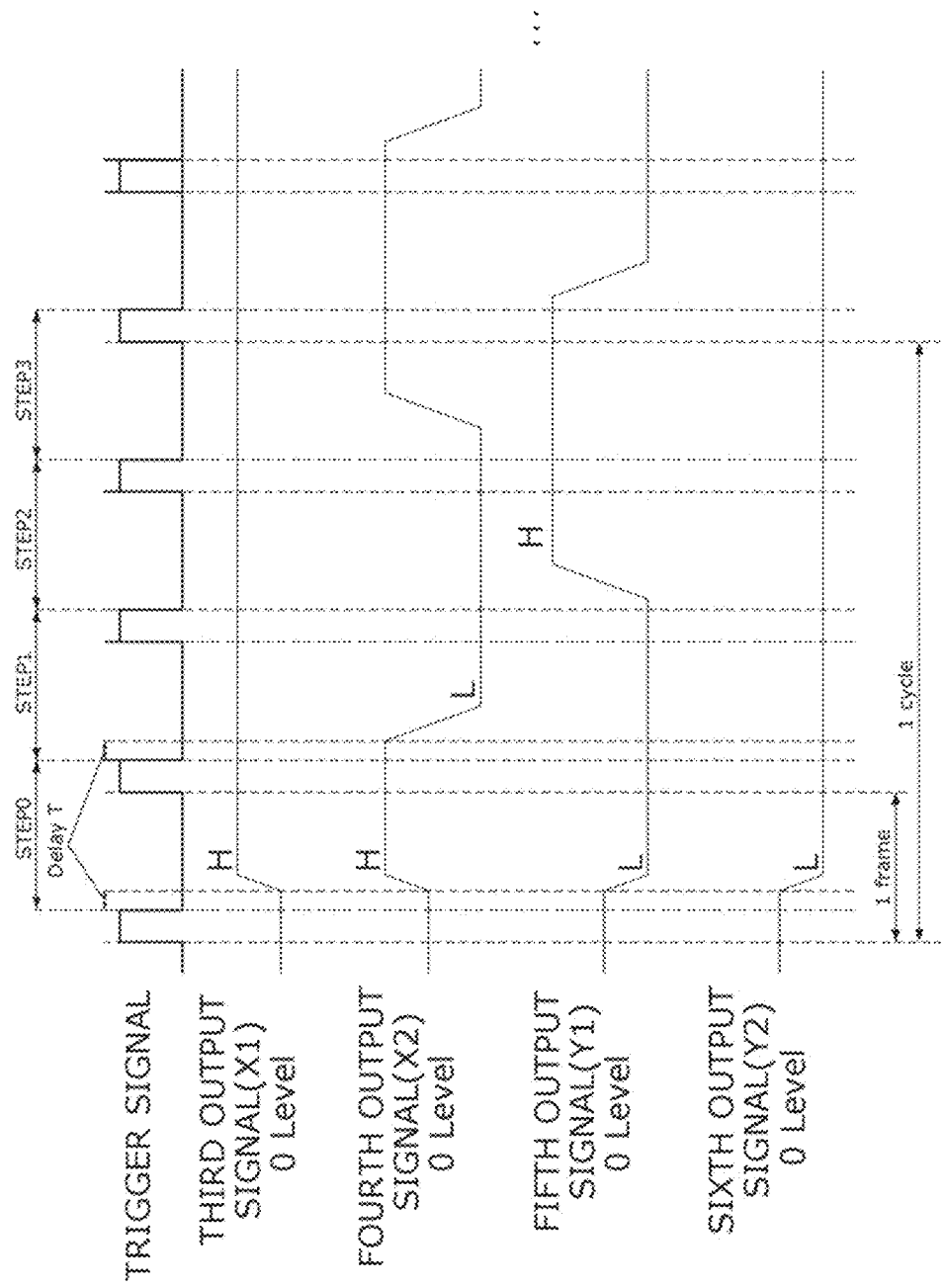

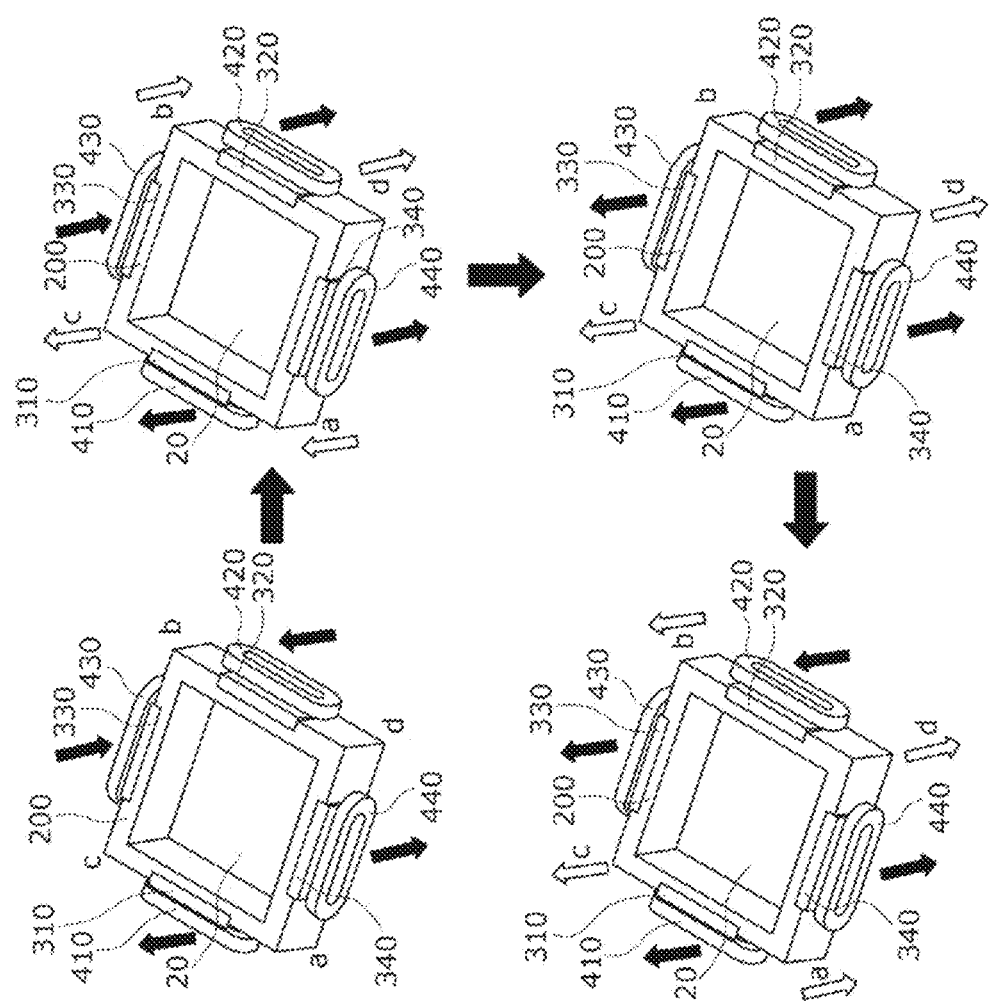

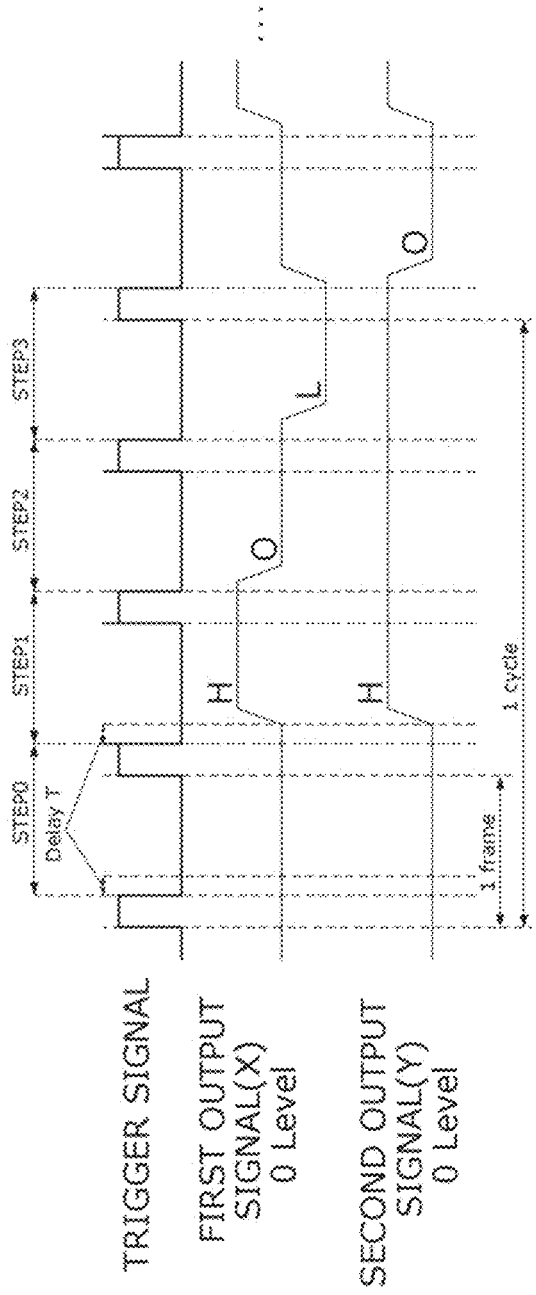

[FIG. 21]
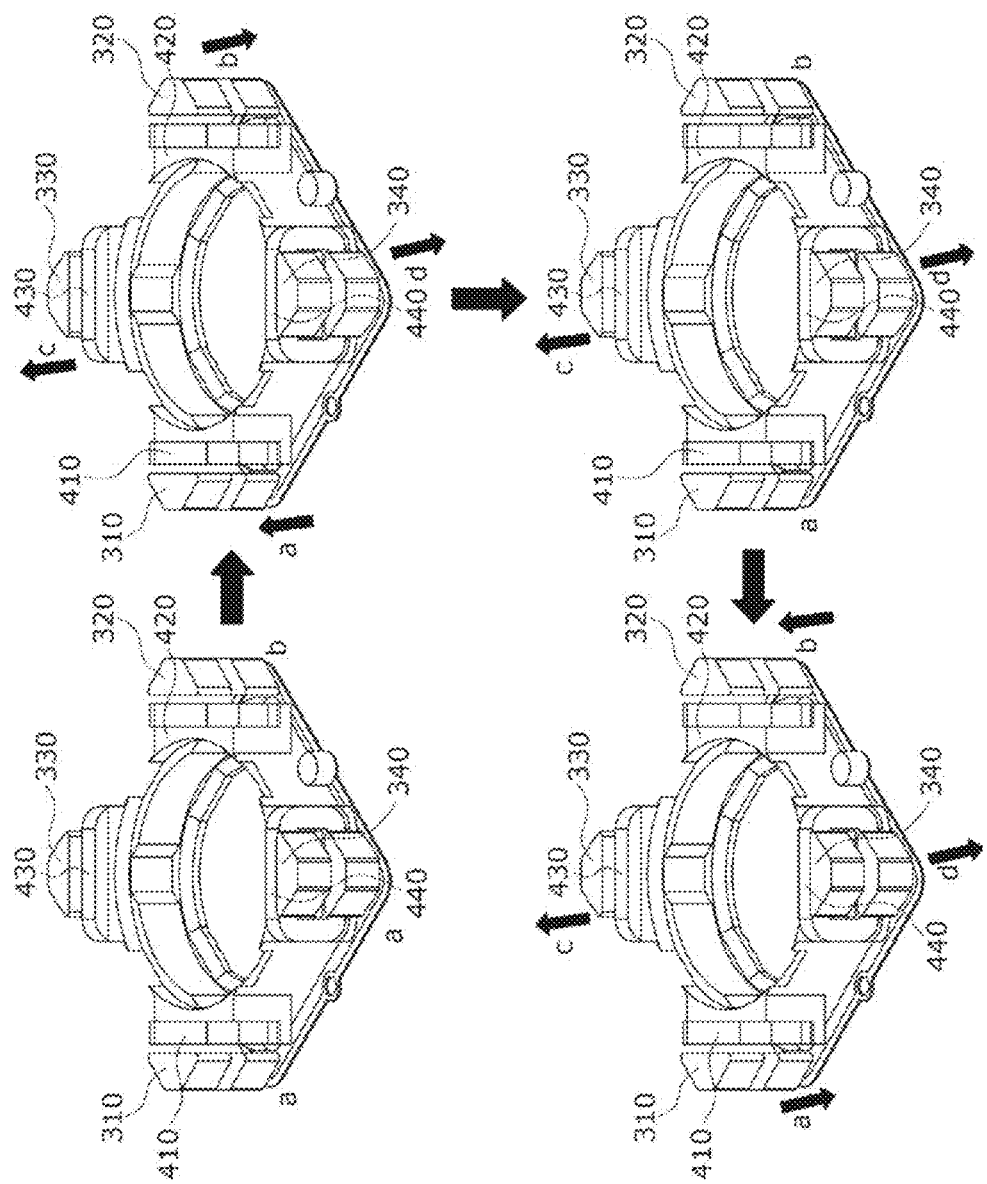

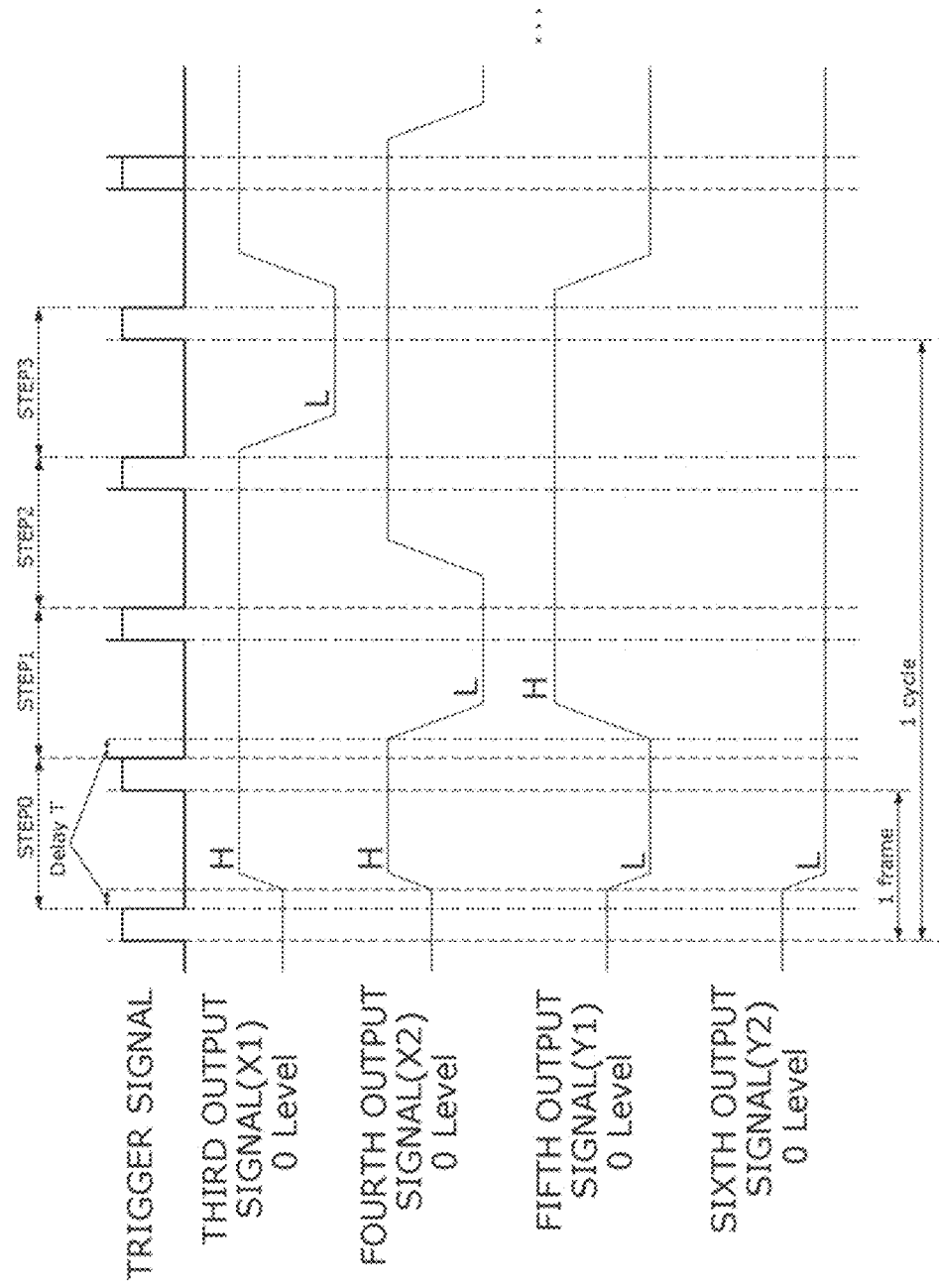
[FIG. 22]

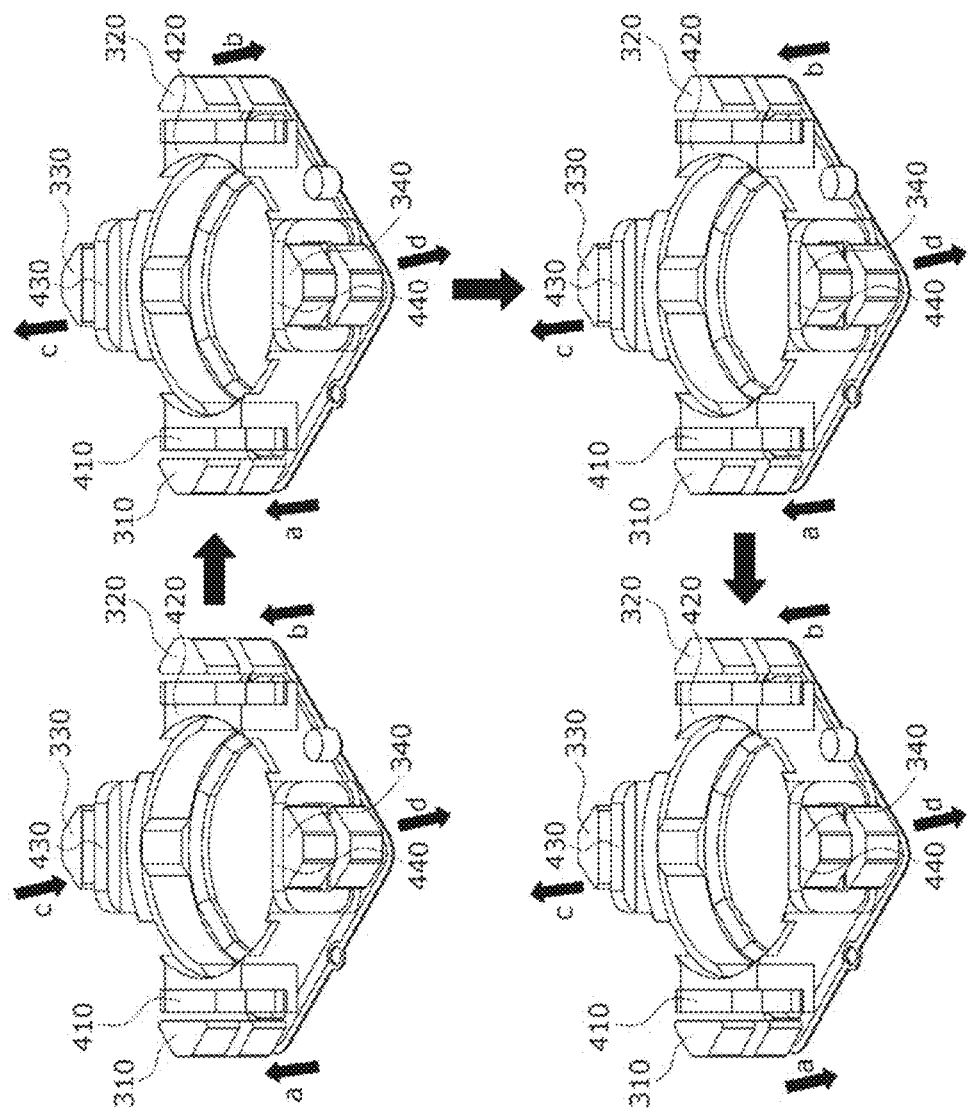
[FIG. 23]

[FIG. 24]
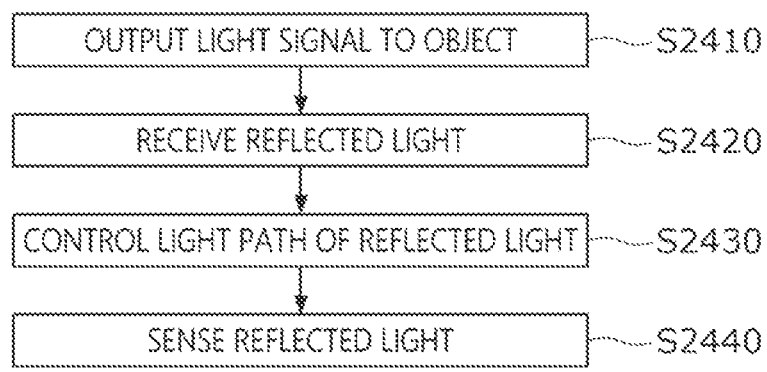

CAMERA MODULE INCLUDING TILTABLE FILTER

CROSS REFERENCE TO RELATED APPLICATIONS

This application is the National Phase of PCT International Application No. PCT/KR2020/006426, filed on May 15, 2020, which claims priority under 35 U.S.C. 119(a) to Patent Application No. 10-2019-0057641, filed in the Republic of Korea on May 16, 2019, all of which are hereby expressly incorporated by reference into the present application.

TECHNICAL FIELD

The present invention relates to a camera module.

BACKGROUND ART

Three-dimensional content is applied to various fields such as education, manufacturing, automatic driving, and the like in addition to the fields of game and culture. In order to obtain the three-dimensional content, a depth map is required.

The depth map is a map showing a spatial distance and shows perspective information of one point with respect to another point in a two-dimensional image.

A time of flight (ToF) method is drawing attention as a technology obtaining the depth map. According to the ToF method, a flight time, that is, a time for which light is emitted, reflected, and returned, is measured to calculate a distance to an object. A big advantage of the ToF method is quickly providing information of a distance in a three-dimensional space in real time. In addition, a user may obtain accurate distance information without applying an additional algorithm or correcting hardware-wise. In addition, even when a very close subject or a moving subject is measured, an accurate depth map may be obtained.

However, in the case of the current ToF method, there is a problem in that information, which can be obtained from one frame, is insufficient, that is, the resolution thereof is low.

In order to improve the resolution, the number of pixels can be increased. However, in this case, there are problems in that a volume and manufacturing costs of a camera module are greatly increased.

Technical Problem

The present invention is directed to providing a camera module in which a time of flight (ToF) method is used to improve a resolution.

More specifically, the present invention is directed to providing a camera module capable of performing a super resolution (SR) technique.

Objectives that should be solved according to embodiments are not limited to the above-described objectives and may include objectives or effects which may be recognized from the technical solution or modes of the invention described below.

Technical Solution

One aspect of the present invention provides a camera module including a light emitting unit configured to output a light signal to an object, and a light receiving unit configured to receive reflected light which is the light signal reflected by the object, wherein the light receiving unit includes a sensor configured to receive the reflected light, a filter through which a specific wavelength band of the reflected light passes, a driving unit configured to tilt the filter, and a driving circuit configured to drive the driving unit, and the filter is tilted in a reference state, in which the filter is not tilted, and in a first tilted state, a second tilted state, and a third tilted state, in which the filter is tilted in different directions, sequentially in order for the sensor to receive the reflected light.

The first tilted state may be a state in which one surface of the filter is inclined in a first direction, the second tilted state may be a state in which the one surface of the filter is inclined in a diagonal direction, and the third tilted state may be a state in which the one surface of the filter is inclined in a second direction which is different from the first direction and the diagonal direction.

The camera module may include a holder to which the filter is coupled, wherein the driving unit may include magnets disposed on the holder and coils facing the magnets.

The magnets include a first magnet, a second magnet, a third magnet, and a fourth magnet.

The coils may include a first coil, a second coil, a third coil, and a fourth coil corresponding to the first magnet, the second magnet, the third magnet, and the fourth magnet, respectively, the first magnet and the second magnet may be disposed in the first direction, the third magnet and the fourth magnet may be disposed in the second direction perpendicular to the first direction, and the driving circuit may output a first signal supplied to the first coil and the second coil and a second signal supplied to the third coil and the fourth coil.

A direction of a force generated due to an interaction between the first coil and the first magnet may be opposite to a direction of a force generated due to an interaction between the second coil and the second magnet, and a direction of a force generated due to an interaction between the third coil and the third magnet may be opposite to a direction of a force generated due to an interaction between the fourth coil and the fourth magnet.

The reference state may be a state in which the driving circuit does not supply the first signal and the second signal to the first coil, the second coil, the third coil, and the fourth coil, the first tilted state may be a state in which the driving circuit supplies the first signal to the first coil and the second coil in the reference state, the second tilted state may be a state in which the driving circuit supplies the second signal to the third coil and the fourth coil in the first tilted state, and the third tilted state may be a state in which the driving circuit stops the supply of the first signal to the first coil and the second coil in the second tilted state.

The camera module may include a housing in which the holder is disposed, and an elastic member by which the holder and the housing are coupled, wherein the filter may have a quadrangular shape, and the first magnet, the second magnet, the third magnet, and the fourth magnet may be disposed at positions corresponding to sides of the filter.

The holder may include a first sidewall, a second sidewall facing the first sidewall, a third sidewall, and a fourth sidewall facing the third sidewall, the first magnet may be disposed on the first sidewall, the second magnet may be disposed on the second sidewall, the third magnet may be disposed on the third sidewall, and the fourth magnet may be disposed on the fourth sidewall.

The holder may include a first corner, a second corner disposed in a diagonal direction of the first corner, a third corner, and a fourth corner disposed in a diagonal direction of the third corner. The first magnet may be disposed at the first corner, the second magnet may be disposed at the second corner, the third magnet may be disposed at the third corner, and the fourth magnet may be disposed at the fourth corner.

The magnets may include a first magnet, a second magnet, a third magnet, and a fourth magnet, the coils may include a first coil, a second coil, a third coil, and a fourth coil corresponding to the first magnet, the second magnet, the third magnet, and the fourth magnet, respectively, the first magnet and the second magnet may be disposed in the first direction, the third magnet and the fourth magnet may be disposed in the second direction perpendicular to the first direction, and the driving circuit may individually supply a signal to the first coil, the second coil, the third coil, and the fourth coil.

Another aspect of the present invention provides a camera module including a light emitting unit configured to output a light signal to an object, and a light receiving unit configured to receive reflected light which is the light signal reflected by the object, wherein the light receiving unit includes a sensor configured to receive the reflected light, a filter disposed to correspond to the sensor, a driving unit configured to tilt the filter, and a driving circuit configured to drive the driving unit, tilted states of the filter include a reference state in which the filter is not tilted, a first tilted state in which the filter is inclined in a first direction, a second tilted state in which the filter is inclined in a diagonal direction, and a third tilted state in which the filter is inclined in a second direction, and the first direction and the second direction are perpendicular to each other.

The first direction may be a direction perpendicular to one surface of the filter.

The sensor may receive the reflected light in the reference state, in the first tilted state, in the second tilted state, and in the third tilted state sequentially.

Still another aspect of the present invention provides a method of controlling a camera module, the method including outputting a light signal to an object, receiving reflected light which is the light signal reflected by the object, controlling a light path of the received reflected light, and sensing the reflected light of which the light path is controlled, wherein the controlling of the light path includes controlling the light path of the reflected light to become any one among a reference light path in which the light path is not changed, a first light path changed from the light path in a first direction, a second light path changed from the light path in a diagonal direction, and a third light path changed from the light path in a second direction, and the first direction and the second direction are perpendicular to each other.

The controlling of the light path may include controlling the light path of the reflected light to become the reference light path, the first light path, the second light path, and the third light path sequentially.

Advantageous Effects

According to embodiments of the present invention, a depth map with high-resolution can be obtained even without increasing the number of pixels of a sensor.

In addition, a high-resolution image can be obtained from a plurality of low-resolution images captured by a camera module according to the present embodiment using a super resolution (SR) technique.

Useful advantages and effects of the present invention are not limited to the above-described contents and will be more easily understood from descriptions of the specific embodiments of the present invention.

DESCRIPTION OF DRAWINGS

FIG. 1 is a perspective view illustrating a camera module according to a present embodiment.

FIG. 2 is an exploded perspective view illustrating the camera module according to the present embodiment.

FIG. 3 is a perspective view illustrating some components of the camera module according to the present embodiment.

FIG. 4 is an exploded perspective view illustrating some components of a light receiving unit.

FIG. 5 is a view for describing a layout of coils according to one embodiment.

FIG. 6 is a view for describing a layout of magnets according to the embodiment of FIG. 5.

FIG. 7 is a view for describing a layout of coils according to one embodiment.

FIG. 8 is a view for describing a layout of magnets according to the embodiment of FIG. 7.

FIG. 9 is a view for describing a driving principle of a driving unit.

FIGS. 10 to 12 are views showing a light path movement process according to the embodiment of the present invention.

FIG. 13 is a view illustrating one example of a variable lens.

FIG. 14 is a view illustrating another example of the variable lens.

FIG. 15 is a view for describing the driving unit and a driving circuit according to the embodiment of the present invention.

FIGS. 16 to 23 are views for describing a control process of the driving unit according to the embodiment.

FIG. 24 is a flowchart illustrating a method of controlling the camera module according to the embodiment of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A. B. and C.

In addition, in descriptions of components of the present invention, terms such as "first," "second," "A," "B," "(a)," and "(b)" can be used. The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

A camera module according to an embodiment of the present invention may be referred to as a camera device, a time of flight (ToF) camera module, a ToF camera device, or the like.

The camera module according to the embodiment of the present invention may be included in an optical device. The optical device may include any one among a mobile phone, a portable phone, a smartphone, a portable smart device, a digital camera, a laptop computer, a digital broadcasting terminal, a personal digital assistant (PDA), a portable multimedia player (PMP), and a navigation device. However, a kind of the optical device is not limited thereto, and any device for capturing an image or taking a picture may be included in the optical device.

Hereinafter, a structure of the ToF camera device according to the present embodiment will be described with reference to the accompanying drawings.

FIG. 1 is a perspective view illustrating the camera module according to the present embodiment, FIG. 2 is an exploded perspective view illustrating the camera module according to the present embodiment, and FIG. 3 is a perspective view illustrating some components of the camera module according to the present embodiment.

The camera module may include a light emitting unit 1. The light emitting unit 1 may be a light emitting module, a light emitting unit, a light emitting assembly, or a light emitting device. The light emitting unit 1 may generate a light signal and emit the light signal to an object. In this case, the light emitting unit 1 may generate and output an output light signal in the form of a pulse wave or continuous wave. The continuous wave may have the form of a sinusoid wave or squared wave. In the present specification, the light signal output from the light emitting unit 1 may mean a light signal incident on the object. The light signal output from the light emitting unit 1 may be referred to as output light, an output light signal, or the like from a viewpoint of the camera module. The light output from the light emitting unit 1 may be referred to as incident light, an incident light signal, or the like from a viewpoint of the object.

The light signal generated by the light emitting unit 1 is emitted to the object for a predetermined integration time. In this case, the integration time means one frame cycle. When a plurality of frames are generated, the preset integration time is repeated. For example, when the ToF camera device captures images of the object at 20 frames per second (FPS), the integration time is $\frac{1}{20}$ [sec]. In addition, when 100 frames are generated, the integration time may be repeated 100 times.

The light emitting unit 1 may generate a plurality of output light signals having different frequencies. The light emitting unit 1 may sequentially and repeatedly generate a plurality of light signals having different frequencies. Alternatively, the light emitting unit 1 may also generate a plurality of light signals having different frequencies at the same time.

The light emitting unit 1 may include a light source 40. The light source 40 may generate light. The light source 40 may output the light. The light source 40 may emit the light. The light generated by the light source 40 may be infrared light with a wavelength of 770 to 3000 nm. Alternatively, the light generated by the light source 40 may be visible light with a wavelength of 380 to 770 nm. The light source 40 may include a vertical cavity surface emitting laser (VCSEL). In addition, the light source 40 may include a light emitting diode (LED). The light source 40 may include a plurality of LEDs arranged in a predetermined pattern. In addition, the light source 40 may include an organic LED (OLED) or laser diode (LD).

The light emitting unit 1 may include a light modulator configured to modulate light. The light source 40 may be repeatedly turned on and off at predetermined time intervals to generate a light signal having the form of a pulse wave or continuous wave. The predetermined time interval may be a frequency of the light signal. The turning on and off of the light source 40 may be controlled by the light modulator. The light modulator may control the turning on and off of the light source 40 to control the light source 40 so as to generate the light signal in the form of the continuous wave or pulse wave. The light modulator may control the light source 40 to generate the light signal in the form of the continuous wave or pulse wave through frequency modulation, pulse modulation, or the like.

The light emitting unit 1 may include a diffuser 50. The diffuser 50 may be a diffuser lens. The diffuser 50 may be disposed in front of the light source 40. A light signal output from the light source 40 may be incident on the object through the diffuser 50. The diffuser 50 may change a light path of the light signal emitted from the light source 40. The diffuser 50 may collect the light signal emitted from the light source 40.

The light emitting unit 1 may include a cover 60. The cover may be disposed to cover the light source 40. The cover 60 may be disposed on a printed circuit board (PCB) 4. The cover 60 may include an upper plate including a hole and side plates extending from the upper plate.

The camera module may include a light receiving unit 2. The light receiving unit 2 may be a light receiving module, a light receiving unit, a light receiving assembly, or a light receiving device. The light receiving unit 2 may detect a reflected light signal output from the light emitting unit 1 and reflected by the object. The light receiving unit 2 may be disposed beside the light emitting unit 1. The light receiving unit 2 may be disposed beside the light emitting unit 1. The light receiving unit 2 may be disposed in the same direction as the light emitting unit 1. The light receiving unit 2 may include a housing 100, a holder 200, magnets 300, coils 400, a substrate 500, an elastic member 600, and a cover 700 and may include a lens module 10, a filter 20, and a sensor 30.

The light receiving unit 2 may include the lens module 10. A light signal reflected by the object may pass through the lens module 10. The sensor 30 may be aligned with an optical axis of the lens module 10. The lens module 10 may be coupled to the housing 100. The lens module 10 may be fixed to the housing 100. The lens module 10 may be tilted or shifted. The lens module 10 may adjust a light path. The lens module 10 may adjust the light path to change a path of light incident on the sensor 30. The lens module 10 may change an angle of a field of view (FOV) or direction of FOV of the incident light.

The light receiving unit 2 may include the filter 20. The filter 20 may be coupled to the holder 200. The filter 20 may be disposed between the lens module 10 and the sensor 30. The filter 20 may be disposed on a light path between the object and the sensor 30. The filter 20 may filter light with a predetermined wavelength range. The filter 20 may allow reflected light with a specific wavelength band to pass therethrough. The filter 20 may allow light with a specific wavelength to pass therethrough. That is, the filter 20 may reflect or absorb and block light excluding the light with the specific wavelength. The filter 20 may allow infrared light to pass therethrough and may block light with a wavelength excluding the infrared light. Alternatively, the filter 20 may allow visible light to pass therethrough and block light with a wavelength excluding the visible light. The filter 20 may be moved. The filter 20 may be integrally moved with the holder 200. The filter 20 may be tilted. The filter 20 may be moved to adjust a light path. The filter 20 may be moved to change a path of light incident on the sensor 30. The filter 20 may change an angle of an FOV, a direction of the FOV, or the like of incident light. As the filter 20 is moved or tilted, the light path of the received reflected light may be controlled. The filter 20 may control the light path of the reflected light to become any one among a reference light path in which the light path is not changed, a first light path in which the light path is changed in a first direction, a second light path in which the light path is changed in a diagonal direction, and a third light path in which the light path is changed in the second direction. The first direction and the second direction may be perpendicular to each other.

The camera module may include the sensor 30. The sensor 30 may sense light. The sensor 30 may receive reflected light. The sensor 30 may be an image sensor configured to sense light. The sensor 30 may sense the light and output an electric signal. The sensor 30 may sense light with a wavelength corresponding to a wavelength of light output from the light source 40. The sensor 30 may sense infrared light. Alternatively, the sensor 30 may sense visible light.

The sensor 30 may include a pixel array configured to receive light passing through the lens module 10 and convert the light into an electric signal corresponding to the light, a driving circuit configured to drive a plurality of pixels included in the pixel array, and a readout circuit configured to read analog pixel signals of the pixels. The readout circuit may compare the analog pixel signal with a reference signal to perform analog-digital conversion so as to generate digital pixel signals (image signals). In this case, the digital pixel signals of the pixels included in the pixel array constitute the image signals, and since the image signals are transmitted in units of frames, the image signals may be defined as an image frame. That is, the image sensor may output a plurality of image frames.

The light receiving unit 2 may three-dimensionally tilt the lens module 10 or the filter 20 using a driving unit including the magnets 300 and the coils 400. The light receiving unit 2 may further include a driving circuit configured to drive the driving unit. The light receiving unit 2 may tilt the lens module 10 or the filter 20 so that a light path of reflected light received by the sensor 30 is repeatedly moved according to a predetermined rule.

The camera module may include the PCB 4. The light emitting unit 1 and the light receiving unit 2 may be disposed on the PCB 4. The PCB 4 may be electrically connected to the light emitting unit 1 and the light receiving unit 2.

The camera module may include a coupling part 3. The coupling part 3 may be electrically connected to the PCB 4. The coupling part 3 may be connected to a component of an optical device. The coupling part 3 may include a connector 7 configured to be connected to the component of the optical device. The coupling part 3 may include a substrate 5 on which the connector 7 is disposed and which is connected to a connecting part 6. The substrate 5 may be a PCB.

The camera module may include the connecting part 6. The connecting part 6 may connect the PCB 4 and the coupling part 3. The connecting part 6 may have a flexible property. The connecting part 6 may be a flexible PCB (FPCB).

The camera module may include a reinforcing plate. The reinforcing plate may include a stiffener. The reinforcing plate may be disposed on a lower surface of the PCB 4. The reinforcing plate may be formed of a steel use stainless (SUS).

The camera module may include a lens driving unit. The camera module may include a voice coil motor (VCM). The camera module may include a lens driving motor. The camera module may include a lens driving actuator.

The camera module may further include an image processing unit. As one example, the image processing unit may be included in the sensor 30. As another example, the image processor may be included in a terminal to which the camera module is coupled. For example, the image processing unit may be included in an application processor (AP). The image processing unit may include an image processor which receives an image signal from the sensor 30 and processes (for example, performs interpolation, frame synthesizing, and the like on) the image signal. Particularly, the image processing unit may use image signals (low-resolution) of a plurality of frames to synthesize into image signals (high-resolution) of one frame. That is, the image processing unit may use a plurality of image frames included in the image signals received from the sensor 30 and generate a synthesized result as a synthesized image. The synthesized image generated by the image processing unit may have a high-resolution when compared to the plurality of image frames output from the sensor 30. That is, the image processing unit may generate a high-resolution image through a super resolution (SR) technique. The plurality of image frames may include image frames generated by changing a light path to different light paths by moving the filter 20.

FIG. 4 is an exploded perspective view illustrating some components of the light receiving unit.

The light receiving unit 2 may include the housing 100, the holder 200, the magnets 300, the coils 400, the substrate 500, the elastic member 600, and the cover 700.

The camera module may include the housing 100. The housing 100 may be disposed on the PCB 4. The housing 100 may be disposed on the PCB 4. The housing 100 may be disposed on an upper surface of the PCB 4. The housing 100 may accommodate the holder 200 therein. The lens module 10 may be coupled to the housing 100. The housing 100 may be a coil case to which a coil is fixed. The coils 400 and the substrate 500 may be attached to the housing 100. The housing 100 may be coupled to a barrel of the lens module 10. In the housing 100, an outer portion to which the coils 400 are coupled and an inner portion to which the lens module 10 is coupled may be integrally formed. Since the housing 100 has the mentioned integral structure, a size can be reduced, and the number of components can be reduced. The housing 100 may be formed of a non-magnetic material.

The camera module may include the holder 200. The filter 20 may be disposed on the holder 200. The holder 200 may be integrally moved with the filter 20. The holder 200 may be connected to the elastic member 600. The holder 200 may be spaced apart from the housing 100. The magnets 300 may be disposed on the holder 200. The holder 200 may be a case in which the filter 20 and the magnets 300 are assembled. Since the holder 200 is an actually driven portion, a weight (size) thereof needs to be minimized. In the present embodiment, in order to minimize the size, an area of an attachment portion of the magnet 300 may be minimized. The holder 200 may be formed of a non-magnetic material in order to minimize a magnetic influence from the magnets 300. The holder 200 may be spaced apart from a base of the housing 100.

The holder 200 may include a lower plate. The filter 20 may be coupled to the lower plate. The filter 20 may be attached to a lower surface of the lower plate using an adhesive. The lower plate of the holder 200 may include a hole. The hole may be hollow. The hole may pass through the lower plate of the holder 200 in an optical axis direction.

The camera module may include the magnets 300. The magnets 300 may be disposed in the holder 200. The magnets 300 may be disposed on an outer circumferential surface of the holder 200. The magnets 300 may protrude further than outer surfaces of the holder 200. The magnets 300 may be opposite to the coils 400. The magnets 300 may electromagnetically interact with the coils 400. The magnets 300 may be disposed on sidewalls of the holder 200. In this case, the magnets 300 may be flat plate magnets each having a flat plate shape. As a modified example, the magnets 300 may be disposed on corner parts between the sidewalls of the holder 200. In this case, the magnets 300 may be corner magnets each having a hexahedron shape of which an inner side surface is wider than an outer side surface.

The magnets 300 may include a plurality of magnets. The magnets 300 may include four magnets. The magnets 300 may include first to fourth magnets 310, 320, 330, and 340. The magnets 300 may include the first magnet 310, the second magnet 320 disposed at a side opposite to the first magnet 310, the third magnet 330, and the fourth magnet 340 disposed at a slide opposite to the third magnet 330. The first magnet 310 and the second magnet 320 may be disposed in the first direction. The third magnet 330 and the fourth magnet 340 may be disposed in the second direction. The first direction and the second direction may be perpendicular to each other.

The camera module may include the coils 400. The coils 400 may be disposed opposite to the magnets 300. The coils 400 may be disposed to face the magnets 300. The coils 400 may electromagnetically interact with the magnets 300. In this case, when currents are supplied to the coils 400 and electromagnetic fields are generated around the coils 400, the magnets 300 may be moved with respect to the coils 400 due to electromagnetic interactions between the magnets 300 and the coils 400. The coils 400 may be coupled to inner surfaces of the substrate 500. The coils 400 and the magnets 300 may be disposed at opposite positions.

The coils 400 may include a plurality of coils. The coils 400 may include four coils. The coils 400 may include a first coil 410, a second coil 420 disposed at a side opposite to the first coil 410, a third coil 430, and a fourth coil 440 disposed at a side opposite to the third coil 430. An individual current may be applied to each of the first to fourth coils 410, 420, 430, and 440. The first to fourth coils 410, 420, 430, and 440 may be electrically separated from each other. The coils 400 may include the first coil 410 opposite to the first magnet 310, the second coil 420 opposite to the second magnet 320, the third coil 430 opposite to the third magnet 330, and the fourth coil 440 opposite to the fourth magnet 340. The first to fourth coils 410, 420, 430, and 440 may be coupled to the housing 100.

Among the first to fourth coils 410 to 440, the facing coils may be formed as an antiparallel structure in which directions of currents flowing in the facing coils are opposite to each other. That is, the first coil 410 and the second coil 420 may be formed as the antiparallel structure, and the third coil 430 and the fourth coil 440 may be formed as the antiparallel structure.

The camera module may include the substrate 500. The substrate 500 may be an FPCB. The substrate 500 may be disposed on the housing 100. The substrate 500 may be disposed on outer surfaces of sidewalls of the housing 100. The substrate 500 may be disposed between the side plates of the cover 700 and the sidewalls of the housing 100. The substrate 500 may be disposed to surround the outer surfaces of four sidewalls of the housing 100. In the present embodiment, a position control guide may be applied between the substrate 500 and the housing 100 to prevent misarrangement of positions of the coils 400.

The substrate 500 may be connected to the PCB 4, which is a main substrate, to transmit signals to the coils 400 after the coils 400 are assembled thereto. The substrate 500 may be fixed to the housing 100, which is the coil case, so that the coils 400 are stably fixed to the substrate 500.

Sensors configured to sense positions of the magnets 300 may also be coupled to the substrate 500. The substrate 500 may be the FPCB. A surface mounting technology (SMT) may be performed on the sensors and the coils 400 to be mounted on the substrate 500. In the present embodiment, since the sensors are coupled to the substrate 500, the camera module may have a structure in which a separate component for supplying currents to the sensors is not required. The sensors may be used for feedback control. The sensors may include Hall sensors or Hall integrated circuits (IC). The sensors may sense the magnets 300. The sensors may sense magnetic forces of the magnets 300. The sensors may be disposed between the coils 400. The sensors may be disposed on the inner surfaces of the substrate 500.

The substrate 500 may include a body part. The coils 400 may be coupled to the body part. A sensor 450 may be coupled to the body part. The body part may be disposed on an outer surface of the housing 100. The substrate 500 may include a terminal part. The terminal part may extend downward from the body part and include a plurality of terminals. The terminal part may be coupled to the PCB 4 by soldering. The terminal part may be formed on a lower end of the substrate 500.

The camera module may include the elastic member 600. The elastic member 600 may be connected to the housing 100. The elastic member 600 may connect the holder 200 and the housing 100. The elastic member 600 may have elasticity. The elastic member 600 may include a portion having elasticity. The elastic member 600 may include a leaf spring. The elastic member 600 may be formed of a metal material.

The camera module may include the cover 700. The cover 700 may be a bracket. The cover 700 may include a cover can. The cover 700 may be disposed to surround the housing 100. The cover 700 may be coupled to the housing 100. The cover 700 may accommodate the housing 100 therein. The cover 700 may constitute an exterior of the camera module. The cover 700 may have a hexahedron of which a lower surface is open. The cover 700 may be a non-magnetic body. The cover 700 may be formed of a metal material. The cover 700 may be formed of a metal plate. The cover 700 may be connected to a ground part of the PCB 4. Accordingly, the cover 700 may be grounded. The cover 700 may block electromagnetic interference (EMI). In this case, the cover 700 may be referred to as an EMI shield can. The cover 700 is a finally assembled component and may protect the product from an external impact. The cover 700 may be formed of a material having a thin thickness and high strength.

FIG. 5 is a view for describing a layout of coils according to one embodiment, and FIG. 6 is a view for describing a layout of magnets according to the embodiment of FIG. 5.

According to one embodiment of the present invention, the magnets may include four magnets. The coils may include four coils to correspond to the magnets.

Referring to FIG. 5, the four magnets may be disposed on the sidewalls of the holder 200. The holder 200 may include a first sidewall, a second sidewall disposed at a side opposite to the first sidewall, and a third sidewall and a fourth sidewall which are disposed between the first sidewall and the second sidewall at opposite sides. The first sidewall and the second sidewall of the holder 200 may face each other. The third sidewall and the fourth sidewall of the holder 200 may face each other. Accordingly, when the filter has a quadrilateral shape, the first to fourth magnets 310 to 340 may be positioned at positions corresponding to sides of the filter. The first magnet 310 may be disposed on the first sidewall of the holder 200, the second magnet 320 may be disposed on the second sidewall of the holder 200, the third magnet 330 may be disposed on the third sidewall of the holder 200, and the fourth magnet 340 may be disposed on the fourth sidewall of the holder 200. The first magnet 310 and the second magnet 320 may be disposed opposite to each other, and the third magnet 330 and the fourth magnet 340 may be disposed opposite to each other.

Referring to FIG. 6, the four coils may be disposed on first to fourth portions 501, 502, 503, and 504 of the substrate. The first portion 501 may be disposed on a first sidewall of the housing 100, the second portion 502 may be disposed on a second sidewall, the third portion 503 may be disposed on a third sidewall, and the fourth portion 504 may be disposed on a fourth sidewall. The third portion 503 of the substrate 500 may connect the first portion 501 of the substrate 500) and the second portion 502 of the substrate 500, and the second portion 502 of the substrate 500 may connect the third portion 503 of the substrate 500 and the fourth portion 504 of the substrate 500, and the first portion 501 and the fourth portion 504 of the substrate 500 may be spaced apart from each other. The first coil 410 may be disposed on the first portion 501, the second coil 420 may be disposed on the second portion 502, the third coil 430 may be disposed on the third portion 503, and the fourth coil 440 may be disposed on the first portion 501.

FIG. 7 is a view for describing a layout of coils according to one embodiment, and FIG. 8 is a view for describing a layout of magnets according to the embodiment of FIG. 7.

Referring to FIG. 7, four magnets may be disposed at corners between the sidewalls of the holder 200. The holder 200 may include a first corner between the first sidewall and the fourth sidewall, a second corner between the second sidewall and the third sidewall, a third corner between the first sidewall and the third sidewall, and a fourth corner between the second sidewall and the fourth sidewall. In the holder 200, the second corner and the first corner may be disposed in a diagonal direction. In the holder 200, the fourth corner and the second corner may be disposed in a diagonal direction. Accordingly, when the filter has the quadrangular shape, the first to fourth magnets may be disposed at positions corresponding to corners of the filter. The first magnet 310 may be disposed at the first corner of the holder 200, the second magnet 320 may be disposed at the second corner of the holder 200, the third magnet 330 may be disposed at the third corner of the holder 200, and the fourth magnet 340 may be disposed at the fourth corner of the holder 200. The first magnet 310 and the second magnet 320 may be disposed opposite to each other, and the third magnet 330 and the fourth magnet 340 may be disposed opposite to each other.

Referring to FIG. 8, four coils may be disposed on first to fourth corner parts of the substrate to be opposite to the four magnets. The substrate may include the first to fourth portions 501, 502, 503, and 504. The substrate may include the first corner part between the first portion 501 and the fourth portion 504, the second corner part between the second portion 502 and the third portion 503, the third corner part between the first portion 501 and the third portion 503, and the fourth corner part between the second portion 502 and the fourth portion 504. The first portion 501 may be disposed on the first sidewall of the housing 100, the second portion 502 may be disposed on the second sidewall, the third portion 503 may be disposed on the third sidewall, and the fourth portion 504 may be disposed on the fourth sidewall. The first coil 410 may be disposed on the first corner part, the second coil 420 may be disposed on the second corner part, the third coil 430 may be disposed on the third corner part, and the fourth coil 440 may be disposed on the fourth corner part.

FIG. 9 is a view for describing a driving principle of the driving unit.

In the present embodiment, the filter 20 may be tilted by a Lorentz force acting between the magnets 300 and the coils 400 through which currents flow. The actuator for generating the Lorentz force may be mainly divided into the magnets 300 and the coils 400. Actual moving parts may be magnets 3M) when the Lorentz force is generated. However, in a modified embodiment, the coils 400 may be moved by the Lorentz force. In order to move the coils 400 vertically, the magnet 300 may be magnetized to two poles as illustrated in FIG. 9B. That is, the magnet 300 may have the form in which two magnets each having two poles are stacked.

FIGS. 10 to 12 are views showing a light path movement process according to the embodiment of the present invention.

According to the embodiment of the present invention, as the driving unit tilts the filter, a light path of reflected light received by the sensor may be moved. For example, a light path of reflected light received by the sensor may be moved in a horizontal direction or vertical direction of the sensor with respect to a first light path or in a diagonal direction between the horizontal direction and the vertical direction.

The predetermined rule may include a plurality of sequences in which light paths of a light signal received by the sensor are disposed at different positions. In the plurality of sequences, any one combination may be repeated among sequentially performed combinations.

The camera module according to one embodiment of the present invention may be driven according to the plurality of sequences including four sequences. Hereinafter, a case, in which the plurality of sequences includes four sequences and the driving unit tilts the filter, will be described as an example.

Four sequences may include a neutral sequence (STEP 0), a first tilt sequence (STEP 1), a second tilt sequence (STEP 2), and a third tilt sequence (STEP 3). Tilted states, which correspond to the sequences, of the filter may include a reference state, a first tilted state in which a light path is inclined in the first direction, a second tilted state in which the light is inclined in the diagonal direction, and a third tilted state in which the light path is inclined in the second direction. In this case, the first direction and the second direction may be perpendicular to each other. The first direction may be perpendicular to one surface of the filter. The neutral sequence and the first to third tilt sequences may be performed sequentially. Accordingly, the sensor may receive reflected light in the reference state and the first to third tilted states sequentially.

First, the camera module may control a light path of reflected light passing through the filter in the neutral sequence (STEP 0). The neutral sequence may mean a state in which the filter, the lens module, and the like are not tilted. That is, the filter may be controlled to be in the reference state in which the filter is not tilted. The camera module may receive a light signal along a light path in the neutral sequence in which the filter is not tilted, that is, along the reference light path. Accordingly, the camera module may capture an image of the object along the reference light path to obtain a first frame image (FRAM 1) from the reference light path.

When the neutral sequence (STEP 0) is completed, the camera module may control a light path of a light signal of light received in the first tilt sequence (STEP 1). Specifically, the camera module may tilt the filter in the first tilt sequence (STEP 1). Accordingly, the filter may be in the first tilted state in which one surface of the filter is inclined in the first direction. For example, due to the tilt in the first tilt sequence (STEP 1), in the filter, a right upper end portion and a right lower end portion may be moved upward with respect to a reference surface, and a left upper end portion and a left lower end portion may be moved downward with respect thereto. The reference surface may mean a surface on which the filter is disposed in the neutral sequence (STEP 0). Moving upward may mean moving away from the sensor, and moving downward may mean moving closer to the sensor. When the filter is controlled to be in the first tilted state in the first tilt sequence (STEP 1), the light path of the received light signal may be moved rightward by as much as +0.5 pixels from the reference light path. That is, the light path of the received light signal may be moved by as much as 0.5 pixels from the reference light path in an X-axis direction. Then, the camera module according to the embodiment of the present invention may obtain a second frame image (FRAME 2) from the light path moved in the first tilt sequence (STEP 1).

When the first tilt sequence (STEP 1) is completed, the camera module may control a light path of a light signal of light received in the second tilt sequence (STEP 2). Specifically, the camera module may tilt the filter in the second tilt sequence (STEP 2). Accordingly, the filter may be in the first tilted state in which one surface of the filter is inclined in the first direction. For example, due to the tilt in the second tilt sequence (STEP 2), in the filter, the left upper end portion may be moved upward with reference to the reference surface, and the right lower end portion may be moved downward with reference thereto. When the filter is controlled in the second tilted state in the second tilt sequence (STEP 2), the light path of the received light signal may be moved rightward by as much as 0.5 pixels and moved downward by as much as 0.5 pixels from the reference light path. That is, the light path of the received light signal may be moved by as much as +0.5 pixels in the X-axis direction and −0.5 pixels in a Y-axis direction from the reference light path. Then, the camera module according to the embodiment of the present invention may obtain a third frame image (FRAME 3) from the light path moved in the second tilt sequence (STEP 2).

When the second tilt sequence (STEP 2) is completed, the camera module may control a light path of a light signal of light received in the third tilt sequence (STEP 3). Specifically, the camera module may tilt the filter in the third tilt sequence (STEP 3). Accordingly, the filter may be in the first tilted state in which one surface of the filter is inclined in the first direction. For example, due to the tilt in the third tilt sequence (STEP 3), in the filter, the left lower end portion and a right lower end may be moved upward with reference to the reference surface, and the left upper end portion and the right upper end portion may be moved downward with reference thereto. When the filter is controlled to be in the third tilted state, the light path of the received light signal may be moved downward by as much as 0.5 pixels from the reference light path in the third tilt sequence (STEP 3). That is, the light path of the received light signal may be moved by as much as −0.5 pixels in the Y-axis direction from the reference light path. Then, the camera module according to the embodiment of the present invention may obtain a fourth frame image (FRAME 4) from the light path moved in the third tilt sequence (STEP 3).

When the first to fourth frame images are generated, the image processing unit may use the first to fourth frame images to generate one high-resolution frame image. In this case, the high-resolution frame image may have a resolution four times higher than a resolution of each of the first to fourth frame images.

FIGS. 13 and 14 are views for describing the tilt of the lens module.

According to the embodiment of the present invention, light path movement may be realized using a variable lens such as a liquid lens capable of controlling a light path by controlling two or more liquids (conductive and non-conductive liquids forming a mutual interface) or an optical member configured to control a light path by controlling a thin film and a liquid.

FIG. 13 is a view illustrating one example of the variable lens.

According to the embodiment of the present invention, the lens module may include the variable lens.

Referring to FIG. 13, the variable lens may have a structure including a fluid 111 disposed between plates 110 disposed on and below the fluid 111. The fluid 111 may be formed of a fluid material with a refractive index of 1 to 2, and when a driving voltage is applied to the fluid 111, the fluid 111 is concentrated in a specific direction so that an angle of a lower plate may be changed with respect to the image sensor. In addition, as the driving voltage (or a difference in driving voltage) applied to the fluid 111 increases, the angle of the lower plate may increase with respect to the sensor. By using such a property, the driving voltage applied to the variable lens may be predetermined so that a first FOV angle Fx and a second FOV angle Fy are changed according to a lens control signal.

The variable lens may be a variable prism, but the range thereof of the present invention is not limited thereto.

FIG. 14 is a view illustrating another example of the variable lens.

Referring to FIG. 14, the variable lens may have a structure including two liquids 121 having different properties and disposed between plates 120 disposed on and below the two liquids 121. Each of the two liquids 121 is formed of a fluid material with a refractive index of 1 to 2, and when a driving voltage is applied to the two liquids 121, an interface formed between the two liquids 121 is deformed, and thus an FOV angle of the interface may be changed. In addition, as the driving voltage (or a difference in driving voltage) applied to two fluids 121 increases, a change in FOV angle of the interface may increase. By using such a property, the driving voltage applied to the variable lens may be predetermined so that a first FOV angle Fx and a second FOV angle Fy are changed according to a lens control signal.

FIG. 15 is a view for describing the driving unit and the driving circuit according to the embodiment of the present invention.

First, the driving circuit may be controlled by a driving controller. The driving controller may be a micro controller unit (MCU) capable of generating a control signal but is not limited thereto. The driving controller may be disposed outside the camera module. For example, when the camera module is installed in a mobile terminal, the driving controller may be disposed in the mobile terminal. As another example, the driving controller may be included in the camera module. The driving controller may be included in the camera module. For example, the driving controller may be disposed in one space of the camera module.

The driving controller may generate a control signal to control the driving circuit to be driven. The driving controller may input the generated control signal to the driving circuit. In this case, the driving controller may transmit the control signal to the driving circuit or receive a signal from the driving circuit through inter-integrated circuit (I2C) communication method. For example, in the I2C communication method, the driving controller may be a device in a master mode, and the driving circuit may be a device in a slave mode. The driving controller in the master mode may transmit the control signal to the driving circuit in the slave mode. To this end, the driving controller may be connected to a serial clock (SCL) communication line and a serial data (SDA) communication line. Communication between the driving controller and the driving circuit through the I2C method is an example, and the present invention is not limited thereto.

The driving controller may control turning the driving circuit on and off through a control signal. That is, the control signal may include information to control operation start and operation stop of the driving circuit. The driving controller may control a voltage level of a signal of the driving circuit using a control signal. That is, the control signal may include information to control a magnitude of a voltage of the signal of the driving circuit. The driving controller may control a delay time using a control signal. That is, the control signal may include information to control the delay time. In this case, the delay time may mean an interval between a time point at which a specific waveform of a trigger signal is generated and a time point at which a specific waveform of the signal is generated. The driving controller may control a frame time using a control signal. That is, the control signal may include information about the frame time. In this case, the frame time may mean a time for which the camera device generates one image frame and may be a period in which the specific waveform is generated in the trigger signal.

The driving circuit may receive the trigger signal from the sensor. The trigger signal may be output from the sensor. The trigger signal may be a square wave signal with a predetermined period. The driving circuit may use the trigger signal to synchronize a driving period of the driving unit with a driving period of the sensor. The driving circuit may include a terminal through which the trigger signal is received.

The driving circuit may receive a voltage from a power source. In this case, the power source may be a power source disposed outside the camera module. For example, the power source may be a system power source of a terminal in which the camera module is installed. The driving circuit may receive a first voltage and a second voltage branched off from a voltage supplied from the power source. The camera module may further include an inductor in order to allow the voltage input from the power source of the camera module to branch off into the first voltage and the second voltage. The branched first voltage and second voltage may be input to the driving circuit. The first voltage may be a voltage used to drive the driving circuit, and the second voltage may be a voltage used to drive the driving unit. The first voltage and the second voltage may have the same magnitude and may be a direct current voltage of 3.3 [V] but is not limited thereto. The driving circuit may include a first power input terminal through which the first voltage is received and a second power input terminal through which the second voltage is received.

The driving circuit may generate a signal synchronized with the integration time of the sensor on the basis of the trigger signal received from the sensor. The driving circuit may generate the signal on the basis of the voltage received from the power source, the trigger signal received from the sensor, and the control signal received from the driving controller. The driving circuit may output the signal to the driving unit. The signal may be a signal with two channels and may include a first signal and a second signal. Accordingly, the driving circuit may include two output terminals. The driving circuit may include a first output terminal to output the first signal and an output terminal to output the second signal, and the terminals may be connected to the driving unit through signal lines. As another example, the signal may be a signal with four channels and may include third to sixth signals. Accordingly, the driving circuit may include four output terminals. The driving circuit may include a third output terminal to output the third signal, a fourth output terminal to output the fourth signal, a fifth output terminal to output the fifth signal, and a sixth output terminal to output the sixth signal, and the terminals may be connected to the driving unit through signal lines.

The driving unit may control the light receiving unit using signals. The driving unit may include first to fourth driving units. Each of the driving units may include one coil and one magnet. For example, when the signal is formed as two channels, the first signal may be input to the first driving unit and the third driving unit. Specifically, the first signal may be input to the first coil of the first driving unit and the third coil of the third driving unit. The second signal may be input to the second driving unit and the fourth driving unit. Specifically, the first signal may be input to the second coil of the second driving unit and the fourth coil of the fourth driving unit. In this case, a direction of a force generated due to an interaction between the first coil and the first magnet may be opposite to a direction of a force generated due to an interaction between the second coil and the second magnet. A direction of a force generated due to an interaction between the third coil and the third magnet may be opposite to a direction of a force generated due to an interaction between the fourth coil and the fourth magnet. This is because the first coil and the second coil, which face each other, are formed as the antiparallel structure and because the third coil and the fourth coil, which face each other, are formed as the antiparallel structure as described above. As another example, when the signal is formed as four channels, each of the four signals may be input to the driving unit. The third signal may be input to the first driving unit. Specifically, the first signal may be input to the first coil of the first driving unit. The fourth signal may be input to the second driving unit. Specifically, the fourth signal may be input to the second coil of the second driving unit. The fifth signal may be input to the third driving unit. Specifically, the fifth signal may be input to the third coil of the third driving unit. The sixth signal may be input to the fourth driving unit. Specifically, the sixth signal may be input to the fourth coil of the fourth driving unit. As another example, each of the driving units may include an electrode sector through which a voltage is applied to the lens module. The electrode sector may receive a signal and adjust the interface of the variable lens according to the signal.

FIGS. 16 to 23 are views for describing a control process of the driving unit according to the embodiment.

In FIGS. 16 and 17, a case, in which the magnets are disposed on side surfaces of the holder and a signal of the driving circuit is formed as two channels, is assumed.

FIG. 16 is a view illustrating a first signal and a second signal generated according to a trigger signal. The first signal may be input to the first coil 410 and the second coil 420, and the second signal may be input to the third coil 430 and the fourth coil 440.

As illustrated in FIG. 16, the trigger signal may be a square wave signal in which a pulse is generated with a predetermined period. A pulse interval, that is, a pulse period, of the trigger signal may be one image frame interval. An interval from a rising edge of the pulse of the trigger signal to a rising edge of a subsequent pulse may be one image frame interval. A pulse width of the trigger signal may be set to be smaller than one image frame interval.

When a sequence of the driving unit starts, a current of the first signal and a current of the second signal may reach set current levels after delay times (Delay T) elapse from a falling edge of the pulse of the trigger signal. A current level of the first signal and a current level of the second signal may be controlled for each frame interval. Each of the first signal and the second signal may be controlled to have a current at a high level or low level for each frame interval. The current at the high level may be in a state in which a value of the current is greater than a value of a current at a reference level, and the current at the low level may be in a state in which a value of the current is smaller than the value of the current at the reference level. The reference level may mean a zero level or a current of zero [A] but is not limited thereto. A state in which the first signal, the second signal, or the like having the current value of the reference level is applied to the coil may be the same as a state in which the first signal or the second signal is not applied to the coil. When the reference level is set to zero [A], the high level may mean a current having a plus (+) value, and the low level may mean a current having a minus (−) value. In sequential steps, when a current level of a signal is different, it may take a predetermined time to raise or lower the current level.

In each of the plurality of sequences, each of the first signal and the second signal may have one of the current value of the set reference level and a current value of the high level higher than the reference level.

Table 1 below is a table expressing the first signal and the second signal illustrated in FIG. 16.

TABLE 1

| STEP | First Signal (X) | Second Signal (Y) |
| --- | --- | --- |
| 0 | 0 | 0 |
| 1 | (+) | 0 |
| 2 | (+) | (+) |
| 3 | 0 | (+) |

In Table 1, minus (−) means the current at the low level, and plus (+) means the current at the high level. STEP 0 means a neutral sequence, STEP 1 means a first tilt sequence. STEP 2 means a second tilt sequence, and STEP 3 means a third tilt sequence. The filter may be in a reference state in STEP 0, in a first tilted state in STEP 1, in a second tilted state in STEP 2, and in a third tilted state in STEP 3. When a falling edge of a first pulse of the trigger signal is generated and the neutral sequence starts, each of the first signal and the second signal may have the current value of the reference level. The first signal and the second signal may not be supplied to the first to fourth filters 410 to 440. Accordingly, as illustrated at a left upper end of FIG. 17, a Lorentz force may not be generated in the driving unit. The filter may be in the reference state. The filter may stay at the reference surface.

When a falling edge of a second pulse of the trigger signal is generated and the first tilt sequence starts, a current level of each of the first signal and the second signal may be controlled (STEP 1). In the first tilt sequence (STEP 1), the first signal may have a current value of the high level, and the second signal may have the current value of the reference level. Referring to a drawing of a right upper end of FIG. 17, since the first signal is applied to the first coil 410 and the second coil 420, an upward force may be generated at the first magnet 310 due to an interaction between the first coil 410 and the first magnet 310, and a downward force may be generated at the second magnet 320 due to an interaction between the second coil 420 and the second magnet 320. Since the first coil 410 and the second coil 420, which are opposite to each other, may be formed to have the antiparallel structure, even when the same signal is applied thereto, directions of the forces may be opposite to each other. Since the second signal is applied to the third coil 430 and the fourth coil 440, a Lorentz force may not be generated. Thus, a first corner a and a third corner c may be moved upward from the reference surface, and a second corner b and the fourth corner d may be moved downward from the reference surface.

When a falling edge of a third pulse of the trigger signal is generated and the second tilt sequence starts, the current level of each of the first signal and the second signal may be controlled (STEP 2). In the second tilt sequence (STEP 2), the first signal may have the current value of the high level, and the second signal may have the current value of the high level. Referring to a drawing of a right lower end of FIG. 17, since the first signal is applied to the first coil 410 and the second coil 420, an upward force may be generated at the first magnet 310 due to an interaction between the first coil 410 and the first magnet 310, and a downward force may be generated at the second magnet 320 due to an interaction between the second coil 420 and the second magnet 320. Since the second signal is applied to the third coil 430 and the fourth coil 440, an upward force may be generated at the third magnet 330 due to an interaction between the third coil 430 and the third magnet 330, and a downward force may be generated at the fourth magnet 340 due to an interaction between the fourth coil 440 and the fourth magnet 340. Thus, the third corner c may be moved upward from the reference surface, and the fourth corner d may be moved downward from the reference surface.

When a falling edge of a fourth pulse of the trigger signal is generated and the third tilt sequence starts, the current level of each of the first signal and the second signal may be controlled (STEP 3). In the third tilt sequence (STEP 3), the first signal may have the current value of the reference level, and the second signal may have the current value of the high level. Referring to a drawing of a left lower end of FIG. 17, since the first signal is applied to the first coil 410 and the second coil 420, a Lorentz force may not be generated. Since the second signal is applied to the third coil 430 and the fourth coil 440, an upward force may be generated at the third magnet 330 due to an interaction between the third coil 430 and the third magnet 330, and a downward force may be generated at the fourth magnet 340 due to an interaction between the fourth coil 440 and the fourth magnet 340. Thus, the second corner b and the third corner c may be moved upward from the reference surface, and the first corner a and the fourth corner d may be moved downward from the reference surface.

In FIGS. 18 and 19, a case, in which the magnets are disposed on the side surfaces of the holder and a signal of the driving circuit is formed as four channels, is assumed.

FIG. 18 is a view illustrating third to sixth signals generated according to a trigger signal. The third signal may be input to the first coil 410, the fourth signal may be input to the second coil 420, the fifth signal may be input to the third coil 430, and the sixth signal may be input to the fourth coil 440.

In each of a plurality of sequences, the third signal may have a current value of a high level that is higher than a preset reference level. In each of the plurality of sequences, the fourth signal may have one of the current value of the high level and a current value of a low level lower than the reference level. In each of the plurality of sequences, the fifth signal may have the current value of the low level. In each of the plurality of sequences, the sixth signal may have one of the current value of the high level and the current value of the low level.

Table 2 below is a table expressing the third to sixth signals illustrated in FIG. 18.

TABLE 2

| STEP | Third Signal (X1) | Fourth Signal (X2) | Fifth Signal (Y1) | Sixth Signal (Y2) |
|---|---|---|---|---|
| 0 | (+) | (+) | (−) | (−) |
| 1 | (+) | (−) | (−) | (−) |
| 2 | (+) | (−) | (+) | (−) |
| 3 | (+) | (+) | (+) | (−) |

When a falling edge of a first pulse of the trigger signal is generated and a neutral sequence starts, each of the third signal and the fourth signal may have the current value of the high level. Each of the fifth signal and the sixth signal may have the current value of the low level. Referring to a drawing of a left upper end of FIG. 19, since the third signal is applied to the first coil 410, an upward force may be generated at the first magnet 310 due to an interaction between the first coil 410 and the first magnet 310. Since the fourth signal is applied to the second coil 420, an upward force may be generated at the second magnet 320 due to an interaction between the second coil 420 and the second magnet 320. Since the fifth signal is applied to the third coil 430, a downward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, since the forces in the same direction are generated at the first magnet 310 and the second magnet 320 which face each other, and the forces in the same direction are generated at the third magnet 330 and the fourth magnet 340 which face each other, the first to fourth corners a to d may maintain the reference surface.

When a falling edge of a second pulse of the trigger signal is generated and a first tilt sequence starts, a current level of each of the third to sixth signals may be controlled (STEP 1). In the first tilt sequence (STEP 1), the third signal may have the current value of the high level, and each of the fourth to sixth signals may have the current value of the low level.

Referring to a drawing of a right upper end of FIG. 19, since the third signal is applied to the first coil 410, an upward force may be generated at the first magnet 310 due to an interaction between the first coil 410 and the first magnet 310. Since the fourth signal is applied to the second coil 420, a downward force may be generated at the second magnet 320 due to an interaction between the second coil 420 and the second magnet 320. Since the fifth signal is applied to the third coil 430, a downward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, the first corner a and the third corner c may be moved upward from the reference surface, and the second corner b and the fourth corner d may be moved downward from the reference surface.

When a falling edge of a third pulse of the trigger signal is generated and a second tilt sequence starts, a current level of each of the third to sixth signals may be controlled (STEP 2). In the second tilt sequence (STEP 2), each of the third and fifth signals may have the current value of the high level, and each of the fourth and sixth signals may have the current value of the low level.

Referring to a drawing of a right lower end of FIG. 19, since the third signal is applied to the first coil 410, an upward force may be generated at the first magnet 310 due to an interaction between the first coil 410 and the first magnet 310. Since the fourth signal is applied to the second coil 420, a downward force may be generated at the second magnet 320 due to an interaction between the second coil 420 and the second magnet 320. Since the fifth signal is applied to the third coil 430, an upward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, the third corner c may be moved upward from the reference surface, and the fourth corner d may be moved downward from the reference surface. The first corner a and the second corner b may be collinear with the reference surface.

When a falling edge of a fourth pulse of the trigger signal is generated and a third tilt sequence starts, a current level of each of the third to sixth signals may be controlled (STEP 3). In the third tilt sequence (STEP 3), each of the third and fourth signals may have the current value of the high level, and each of the fifth and sixth signals may have the current value of the low level.

Referring to a drawing of a left lower end of FIG. 19, since the third signal is applied to the first coil 410, an upward force may be generated at the first magnet 310 due to an interaction between the first coil 410 and the first magnet 310. Since the fourth signal is applied to the second coil 420, an upward force may be generated at the second magnet 320 due to an interaction between the second coil 420 and the second magnet 320. Since the fifth signal is applied to the third coil 430, an upward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, the second corner b and the third corner c may be moved upward from the reference surface, and the first corner a and the fourth corner d may be moved downward from the reference surface.

In FIGS. 20 and 21, a case, in which the magnets are disposed at the corners of the holder and a signal of the driving circuit is formed as two channels, is assumed.

FIG. 20 is a view illustrating a first signal and a second signal generated according to a trigger signal. The first signal may be input to the first coil 410 and the second coil 420, and the second signal may be input to the third coil 430 and fourth coil 440.

In each of a plurality of sequences, the first signal may have one among a current value of a preset reference level, a current value of a high level higher than the reference level, and a current value of a low level lower than the reference level. In each of the plurality of sequences, the second signal may have one of the current value of the reference level and the current value of the high level.

Table 3 below is a table expressing the first signal and the second signal illustrated in FIG. 20.

TABLE 3

| STEP | First Signal (X) | Second Signal (Y) |
|---|---|---|
| 0 | 0 | 0 |
| 1 | (+) | (+) |
| 2 | 0 | (+) |
| 3 | (−) | (+) |

In Table 3, minus (−) means the current at the low level, and plus (+) means the current at the high level. STEP 0 means a neutral sequence, STEP 1 means a first tilt sequence, STEP 2 means a second tilt sequence, and STEP 3 means a third tilt sequence. When a falling edge of a first pulse of the trigger signal is generated and the neutral sequence starts, each of the first signal and second signal may have the current value of the reference level. When the current value of the reference level is set to zero [A], as illustrated in a left upper end of FIG. 21, a Lorentz force may not be generated at the driving unit. Accordingly, the filter may maintain the reference surface.

When a falling edge of a second pulse of the trigger signal is generated and the first tilt sequence starts, a current level of each of the first signal and the second signal may be controlled (STEP 1). In the first tilt sequence (STEP 1), the first signal may have the current value of the high level, and the second signal may have the current value of the high level. Referring to a drawing of a right upper end of FIG. 21, since the first signal is applied to the first coil 410 and the second coil 420, an upward force may be generated at the first magnet 310 due to an interaction between the first coil 410 and the first magnet 310, and a downward force may be generated at the second magnet 320 due to an interaction between the second coil 420 and the second magnet 320. Since the second signal is applied to the third coil 430 and the fourth coil 440, an upward force may be generated at the third magnet 330 due to an interaction between the third coil 430 and the third magnet 330, and a downward force may be generated at the fourth magnet 340 due to an interaction between the fourth coil 440 and the fourth magnet 340. Thus, a first corner a and a third corner c may be moved upward from the reference surface, and a second corner b and a fourth corner d may be moved downward from the reference surface.

When a falling edge of a third pulse of the trigger signal is generated and the second tilt sequence starts, a current level of each of the first signal and the second signal may be controlled (STEP 2). In the second tilt sequence (STEP 2), the first signal may have the current value of the reference level, and the second signal may have the current value of the high level.

Referring to a drawing of a right lower end of FIG. 21, since the first signal is applied to the first coil 410 and the second coil 420, a Lorentz force may not be generated. Since the second signal is applied to the third coil 430 and the fourth coil 440, an upward force may be generated at the third magnet 330 due to an interaction between the third coil 430 and the third magnet 330, and a downward force may be generated at the fourth magnet 340 due to an interaction between the fourth coil 440 and the fourth magnet 340. Thus, the third corner c may be moved upward from the reference surface, and the fourth corner d may be moved downward from the reference surface.

When a falling edge of a fourth pulse of the trigger signal is generated and the third tilt sequence starts, a current level of each of the first signal and the second signal may be controlled (STEP 3). In the third tilt sequence (STEP 3), the first signal may have the current value of the low level, and the second signal may have the current value of the high level.

Referring to a drawing of a left lower end of FIG. 21, since the first signal is applied to the first coil 410 and the second coil 420, a downward force may be generated at the first magnet 310 due to an interaction between the first coil 410 and the first magnet 310, and an upward force may be generated at the second magnet 320 due to an interaction between the second coil 420 and the second magnet 320. Since the second signal is applied to the third coil 430 and the fourth coil 440, an upward force may be generated at the third magnet 330 due to an interaction between the third coil 430 and the third magnet 330, and a downward force may be generated at the fourth magnet 340 due to an interaction between the fourth coil 440 and the fourth magnet 340. Thus, the second corner b and the third corner c may be moved upward from the reference surface, and the first corner a and the fourth corner d may be moved downward from the reference surface.

In FIG. 22 and FIG. 23, a case, in which the magnets are disposed at the corners of the holder and a signal of the driving circuit is formed as four channels, is assumed.

FIG. 22 is a view illustrating third to sixth signals generated according to a trigger signal. The third signal may be input to the first coil 410, the fourth signal may be input to the second coil 420, the fifth signal may be input to the third coil 430, and the sixth signal may be input to the fourth coil 440.

In each of a plurality of sequences, each of the third to fifth signals may have one of a current value of a high level higher than a reference level and a current value of a low level lower than the reference level. The sixth signal may have the current value of the low level.

Table 4 below is a table expressing the third to sixth signals illustrated in FIG. 22.

TABLE 4

| STEP | Third Signal (X1) | Fourth Signal (X2) | Fifth Signal (Y1) | Sixth Signal (Y2) |
|---|---|---|---|---|
| 0 | (+) | (+) | (−) | (−) |
| 1 | (+) | (−) | (+) | (−) |
| 2 | (+) | (+) | (+) | (−) |
| 3 | (−) | (+) | (+) | (−) |

When a falling edge of a first pulse of the trigger signal is generated and a neutral sequence starts, each of the third signal and the fourth signal may have the current value of the high level. Each of the fifth signal and the sixth signal may have the current value of the low level. Referring to a drawing of a left upper end of FIG. 23, since the third signal is applied to the first coil 410, an upward force may be generated at the first magnet 310 due to an interaction between the first coil 410 and the first magnet 310. Since the fourth signal is applied to the second coil 420, an upward force may be generated at the second magnet 320 due to an interaction between the second coil 420 and the second magnet 320. Since the fifth signal is applied to the third coil 430, a downward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, since the forces in the same direction are generated at the first magnet 310 and the second magnet 320 which face each other, and the forces in the same direction are generated at the third magnet 330 and the fourth magnet 340 which face each other, the first to fourth corners a to d may maintain the reference surface.

When a falling edge of a second pulse of the trigger signal is generated and a first tilt sequence starts, a current level of each of the third to sixth signals may be controlled (STEP 1). In the first tilt sequence (STEP 1), each of the third and fifth signals may have the current value of the high level, and each of the fourth and sixth signals may have the current value of the low level.

Referring to a drawing of a right upper end of FIG. 23, since the third signal is applied to the first coil 410, an upward force may be generated at the first magnet 310 due to an interaction between the first coil 410 and the first magnet 310. Since the fourth signal is applied to the second coil 420, a downward force may be generated at the second magnet 320 due to an interaction between the second coil 420 and the second magnet 320. Since the fifth signal is applied to the third coil 430, an upward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, the first corner a and the third corner c may be moved upward from the reference surface, and the second corner b and the fourth corner d may be moved downward from the reference surface.

When a falling edge of a third pulse of the trigger signal is generated and a second tilt sequence starts, a current level of each of the third to sixth signals may be controlled (STEP 2). In the second tilt sequence (STEP 2), each of the third to fifth signals may have the current value of the high level, and the sixth signal may have the current value of the low level.

Referring to a drawing of a right lower end of FIG. 23, since the third signal is applied to the first coil 410, an upward force may be generated at the first magnet 310 due to an interaction between the first coil 410 and the first magnet 310. Since the fourth signal is applied to the second coil 420, an upward force may be generated at the second magnet 320 due to an interaction between the second coil 420 and the second magnet 320. Since the fifth signal is applied to the third coil 430, an upward force may be generated at the third magnet 330 due to an interaction between the third coil 430 and the third magnet 330. Since the sixth signal is applied to the signal fourth coil 440, a downward force may be generated at the fourth magnet 340 due to an interaction between the fourth coil 440 and the fourth magnet 340. Thus, the third corner c may be moved upward from the reference surface, and the fourth corner d may be moved downward from the reference surface. A force at the first corner a and a force at the second corner b may be offset so that the first corner a and the second corner b may be collinear with the reference surface.

When a falling edge of a fourth pulse of the trigger signal is generated and a third tilt sequence starts, a current level of each of the third to sixth signals may be controlled (STEP 3). In the third tilt sequence (STEP 3), each of the third and sixth signals may have the current value of the low level, and each of the fourth and fifth signals may have the current value of the high level.

Referring to a drawing of a left lower end of FIG. 23, since the third signal is applied to the first coil 410, a downward force may be generated at the first magnet 310 due to an interaction between the first coil 410 and the first magnet 310. Since the fourth signal is applied to the second coil 420, an upward force may be generated at the second magnet 320 due to an interaction between the second coil 420 and the second magnet 320. Since the fifth signal is applied to the third coil 430, an upward force may be generated at the third magnet 330 due to an interaction between the third coil 430 and the third magnet 330. Since the sixth signal is applied to the fourth coil 440, a downward force may be generated at the fourth magnet 340 due to an interaction between the fourth coil 440 and the fourth magnet 340. Thus, the second corner b and the third corner c may be moved upward from the reference surface, and the first corner a and the fourth corner d may be moved downward from the reference surface.

FIG. 24 is a flowchart illustrating a method of controlling the camera module according to the embodiment of the present invention.

Referring to FIG. 24, the camera module may output a light signal to the object (S2410).

The camera module may receive reflected light which is the light signal reflected by the object (S2420). The camera module may receive the reflected light, which is the reflected light signal, from the object.

The camera module may control a light path of the received reflected light (S2430). Specifically, the camera module may control the light path of the reflected light to become any one of a reference light path and first to third light paths. The camera module may control the light path of the reflected light to become the reference light path to the first to third light paths sequentially. That is, the camera module may control the light path of the reflected to become the light reference light path, the first light path, the second light path, and the third light path sequentially. The reference light path may mean a light path which is not changed. The first light path may mean a light path changed in a first direction. The second light path may mean a light path changed in a diagonal direction. The third light path may mean a light path changed in a second direction. In this case, the first direction and the second direction may be perpendicular to each other.

The camera module may sense the reflected light of which the light path is controlled (S2440).

Although the embodiments of the present invention have been described in detail with reference to the accompanying drawings, it will be understood by those skilled in the art that the invention may be performed in different concrete forms without changing the technological scope and essential features. Therefore, the above-described embodiments should be considered as only examples in all aspects and not for purposes of limitation.

The invention claimed is:

1. A camera module comprising:
a light emitter outputting a light signal to an object; and
a light receiver receiving reflected light which is the light signal reflected by the object,
wherein the light receiver includes a sensor configured to receive the reflected light, a filter through which a specific wavelength band of the reflected light passes, a driver having magnets and coils, the driver being configured to tilt the filter, and a driving circuit configured to drive the driver,
the filter is tilted in a reference state, in which the filter is not tilted, and in a first tilted state, a second tilted state, and a third tilted state, in which the filter is tilted in different directions, sequentially in order for the sensor to receive the reflected light,
the first tilted state is a state in which one surface of the filter is inclined in a first direction,
the second tilted state is a state in which the one surface of the filter is inclined in a diagonal direction, and
the third tilted state is a state in which the one surface of the filter is inclined in a second direction which is different from the first direction and the diagonal direction.

2. The camera module of claim 1, further comprising a holder to which the filter is coupled,
wherein the magnets are disposed on the holder and the coils are facing the magnets.

3. The camera module of claim 2, wherein:
the magnets include a first magnet, a second magnet, a third magnet, and a fourth magnet;
the coils include a first coil, a second coil, a third coil, and a fourth coil corresponding to the first magnet, the second magnet, the third magnet, and the fourth magnet, respectively;
the first magnet and the second magnet are disposed in the first direction;
the third magnet and the fourth magnet are disposed in the second direction perpendicular to the first direction; and
the driving circuit outputs a first signal supplied to the first coil and the second coil and a second signal supplied to the third coil and the fourth coil.

4. The camera module of claim 3, wherein:
a direction of a force generated due to an interaction between the first coil and the first magnet is opposite to a direction of a force generated due to an interaction between the second coil and the second magnet; and
a direction of a force generated due to an interaction between the third coil and the third magnet is opposite to a direction of a force generated due to an interaction between the fourth coil and the fourth magnet.

5. The camera module of claim 3, wherein:
the reference state is a state in which the driving circuit does not supply the first signal and the second signal to the first coil, the second coil, the third coil, and the fourth coil;
the first tilted state is a state in which the driving circuit supplies the first signal to the first coil and the second coil in the reference state;
the second tilted state is a state in which the driving circuit supplies the second signal to the third coil and the fourth coil in the first tilted state; and
the third tilted state is a state in which the driving circuit stops the supply of the first signal to the first coil and the second coil in the second tilted state.

6. The camera module of claim 4, further comprising:
a housing in which the holder is disposed; and
an elastic member having elasticity by which the holder and the housing are coupled,
wherein the filter has a quadrangular shape, and
the first magnet, the second magnet, the third magnet, and the fourth magnet are disposed at positions corresponding to sides of the filter.

7. The camera module of claim 3, wherein:
the holder includes a first sidewall, a second sidewall facing the first sidewall, a third sidewall, and a fourth sidewall facing the third sidewall;
the first magnet is disposed on the first sidewall;
the second magnet is disposed on the second sidewall;
the third magnet is disposed on the third sidewall; and
the fourth magnet is disposed on the fourth sidewall.

8. The camera module of claim 3, wherein:
the holder includes a first corner, a second corner disposed in a diagonal direction of the first corner, a third corner, and a fourth corner disposed in a diagonal direction of the third corner;
the first magnet is disposed at the first corner;
the second magnet is disposed at the second corner;
the third magnet is disposed at the third corner; and
the fourth magnet is disposed at the fourth corner.

9. The camera module of claim 2, wherein:
the magnets include a first magnet, a second magnet, a third magnet, and a fourth magnet;
the coils include a first coil, a second coil, a third coil, and a fourth coil corresponding to the first magnet, the second magnet, the third magnet, and the fourth magnet, respectively;
the first magnet and the second magnet are disposed in the first direction;

the third magnet and the fourth magnet are disposed in the second direction perpendicular to the first direction; and the driving circuit individually supplies a signal to the first coil, the second coil, the third coil, and the fourth coil.

10. A camera module comprising:

a light emitter outputting a light signal to an object; and a light receiver receiving reflected light which is the light signal reflected by the object, wherein the light receiver includes a sensor configured to receive the reflected light, a filter disposed to correspond to the sensor, a driver including magnets and coils, the driver being configured to tilt the filter, and a driving circuit configured to drive the driver, tilted states of the filter include a reference state in which the filter is not tilted, a first tilted state in which the filter is inclined in a first direction, a second tilted state in which the filter is inclined in a diagonal direction, and a third tilted state in which the filter is inclined in a second direction, and the first direction and the second direction are perpendicular to each other.

11. The camera module of claim 10, wherein the first direction is a direction perpendicular to one surface of the filter.

12. The camera module of claim 10, wherein the sensor receives the reflected light in the reference state, in the first tilted state, in the second tilted state, and in the third tilted state sequentially.

13. A method of controlling a camera module, comprising:

outputting a light signal to an object;

receiving reflected light which is the light signal reflected by the object;

controlling a light path of the received reflected light; and sensing the reflected light of which the light path is controlled, wherein the controlling of the light path includes controlling the light path of the reflected light to become any one among a reference light path in which the light path is not changed, a first light path changed from the light path in a first direction, a second light path changed from the light path in a diagonal direction, and a third light path changed from the light path in a second direction, the first direction and the second direction are perpendicular to each other, and the controlling of the light path includes controlling the light path of the reflected light to become the reference light path, the first light path, the second light path, and the third light path sequentially.

* * * * *